(12) United States Patent
Koito et al.

(10) Patent No.: US 12,345,985 B2
(45) Date of Patent: Jul. 1, 2025

(54) OPTICAL ELEMENT

(71) Applicant: Japan Display Inc., Tokyo (JP)

(72) Inventors: Takeo Koito, Tokyo (JP); Kojiro Ikeda, Tokyo (JP); Yoshikatsu Imazeki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/768,513

(22) Filed: Jul. 10, 2024

(65) Prior Publication Data
US 2024/0361649 A1 Oct. 31, 2024

Related U.S. Application Data

(63) Continuation of application No. PCT/JP2022/042441, filed on Nov. 15, 2022.

(30) Foreign Application Priority Data

Jan. 20, 2022 (JP) .................................. 2022-007443

(51) Int. Cl.
*G02F 1/1345* (2006.01)
*G02F 1/1333* (2006.01)
(Continued)

(52) U.S. Cl.
CPC .... *G02F 1/13452* (2013.01); *G02F 1/133345* (2013.01); *G02F 1/13439* (2013.01); *G02F 1/13458* (2013.01); *G02F 1/1347* (2013.01)

(58) Field of Classification Search
CPC ........... G02F 1/13452; G02F 1/133345; G02F 1/13439; G02F 1/13458; G02F 1/1347
See application file for complete search history.

(56) References Cited

U.S. PATENT DOCUMENTS 10,126,607 B2 * 11/2018 Presniakov ............... G02F 1/29
2007/0024801 A1 * 2/2007 Horiuchi ................... G02F 1/29
349/161

(Continued)

FOREIGN PATENT DOCUMENTS

JP 2007-034083 A 2/2007
JP 2012-137536 A 7/2012
JP 2021-117344 A 8/2021

OTHER PUBLICATIONS

Search Report issued in related International Patent Application No. PCT/JP2022/042441 mailed on Jan. 24, 2023 and English translation of same. 6 pages.

(Continued)

*Primary Examiner* — Anne M Hines
(74) *Attorney, Agent, or Firm* — K&L Gates LLP

(57) ABSTRACT

An optical element includes a plurality of stacked liquid crystal cells. The plurality of stacked liquid crystal cells each includes a first substrate on which a first transparent electrode, a second transparent electrode, a first pad, a second pad, and a third pad are arranged, a second substrate on which a third transparent electrode and a fourth transparent electrode are arranged, and a liquid crystal layer between the first substrate and the second substrate. The first pad, the second pad, and the third pad of each of the plurality of stacked liquid crystal cells are electrically connected to a first inter-cell conductive member, a second inter-cell conductive member, and a third inter-cell conductive member, respectively, extending in a stacking direction.

17 Claims, 35 Drawing Sheets

(51) Int. Cl.
    *G02F 1/1343*     (2006.01)
    *G02F 1/1347*     (2006.01)

(56) References Cited

U.S. PATENT DOCUMENTS

| | | |
|---|---|---|
| 2010/0079694 A1 | 4/2010 | Yoshida et al. |
| 2018/0196318 A1* | 7/2018 | Presniakov ....... G02F 1/134363 |
| 2022/0357614 A1 | 11/2022 | Koito et al. |

OTHER PUBLICATIONS

Written Opinion issued in related International Patent Application No. PCT/JP2022/042441 mailed on Jan. 24, 2023. 4 pages.
English translation of Office Action dated Jan. 21, 2025, issued in related Japanese Patent Application No. 2023-575084. 4 pages.
English machine translation of Office Action dated Feb. 10, 2025 issued in Korean Appl. No. 10-2024-7023050. 6 pages.

\* cited by examiner

OPTICAL ELEMENT

CROSS-REFERENCE TO RELATED APPLICATIONS

This application is a Continuation of International Patent Application No. PCT/JP2022/042441, filed on Nov. 15, 2022, which claims the benefit of priority to Japanese Patent Application No. 2022-007443, filed on Jan. 20, 2022, the entire contents of which are incorporated herein by reference.

FIELD

An embodiment of the present invention relates to an optical element that controls a distribution of light emitted from a light source using a liquid crystal.

BACKGROUND

An optical element which is a so-called liquid crystal lens has been conventionally known in which a change in the refractive index of a liquid crystal is utilized by adjusting a voltage applied to the liquid crystal (for example, see Japanese laid-open patent publication No. 2021-117344).

SUMMARY

An optical element according to an embodiment of the present invention includes a plurality of stacked liquid crystal cells. The plurality of stacked liquid crystal cells each includes a first substrate on which a first transparent electrode, a second transparent electrode, a first pad, a second pad, and a third pad are arranged, a second substrate on which a third transparent electrode and a fourth transparent electrode are arranged, and a liquid crystal layer between the first substrate and the second substrate. The first pad, the second pad, and the third pad of each of the plurality of stacked liquid crystal cells are electrically connected to a first inter-cell conductive member, a second inter-cell conductive member, and a third inter-cell conductive member, respectively, extending in a stacking direction.

BRIEF DESCRIPTION OF DRAWINGS

FIG. 17 is a schematic side view of an optical element according to an embodiment of the present invention (Fifth Embodiment).

DESCRIPTION OF EMBODIMENTS

Figure 1A:
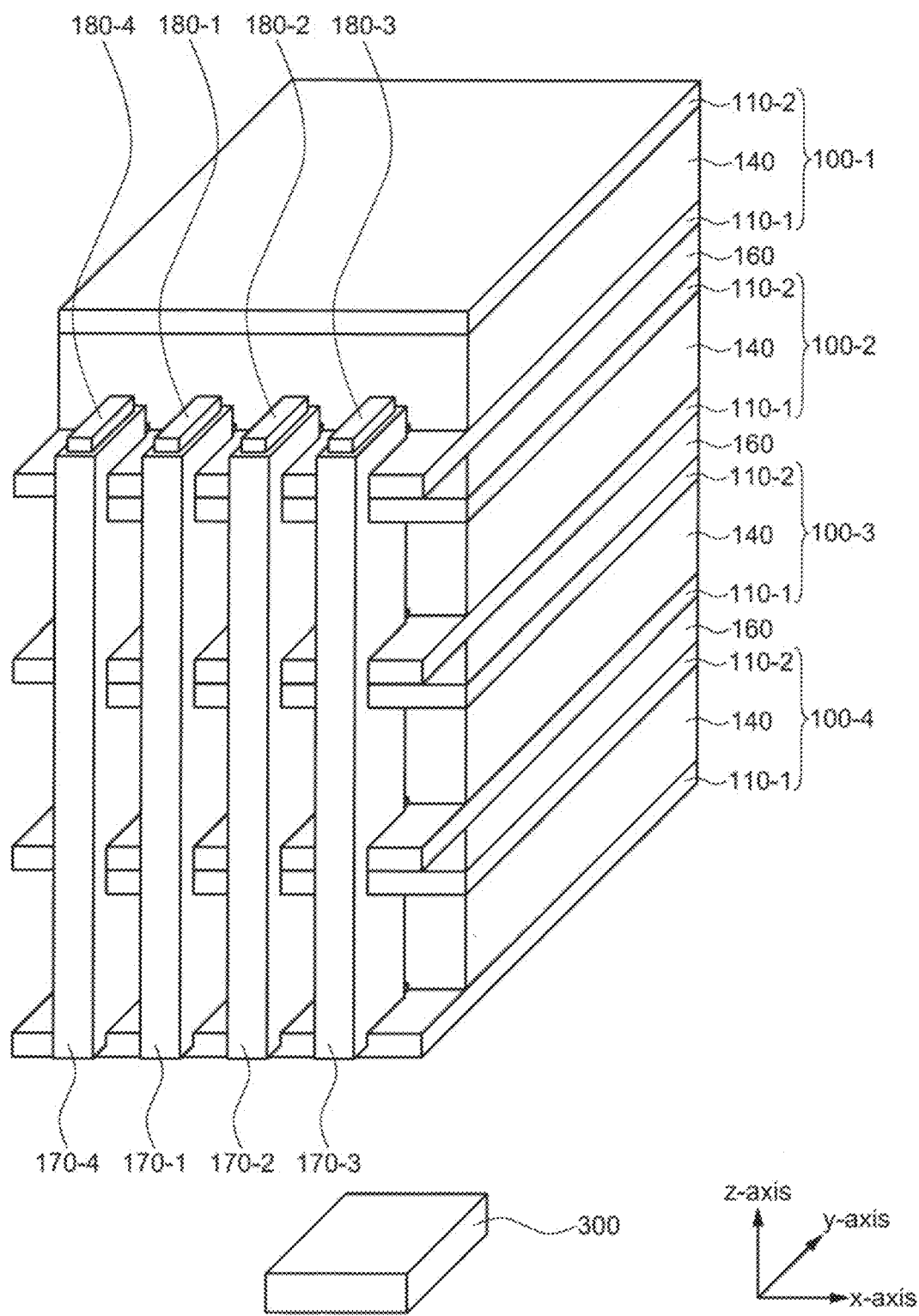
FIG. 1A is a schematic perspective view of an optical element according to an embodiment of the present invention (First Embodiment).

In general, in an optical element including a plurality of liquid crystal cells, an FPC is connected to each of the plurality of liquid crystal cells. That is, it is common to drive the optical element using a plurality of FPCs. However, such an optical element may have a large number of wirings, which may complicate the mounting process and increase the manufacturing cost.

In view of the above problem, an embodiment of the present invention provides an optical element having electrical connections that enable a plurality of liquid crystal cells to be driven simultaneously by inputting a single signal.

Hereinafter, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via yet another structure over a certain structure, are both included.

First Embodiment

An optical element 10 according to an embodiment of the present invention is described with reference to FIGS. 1 to 7F.

[1. Configuration of Optical Element 10]

Figure 1B:
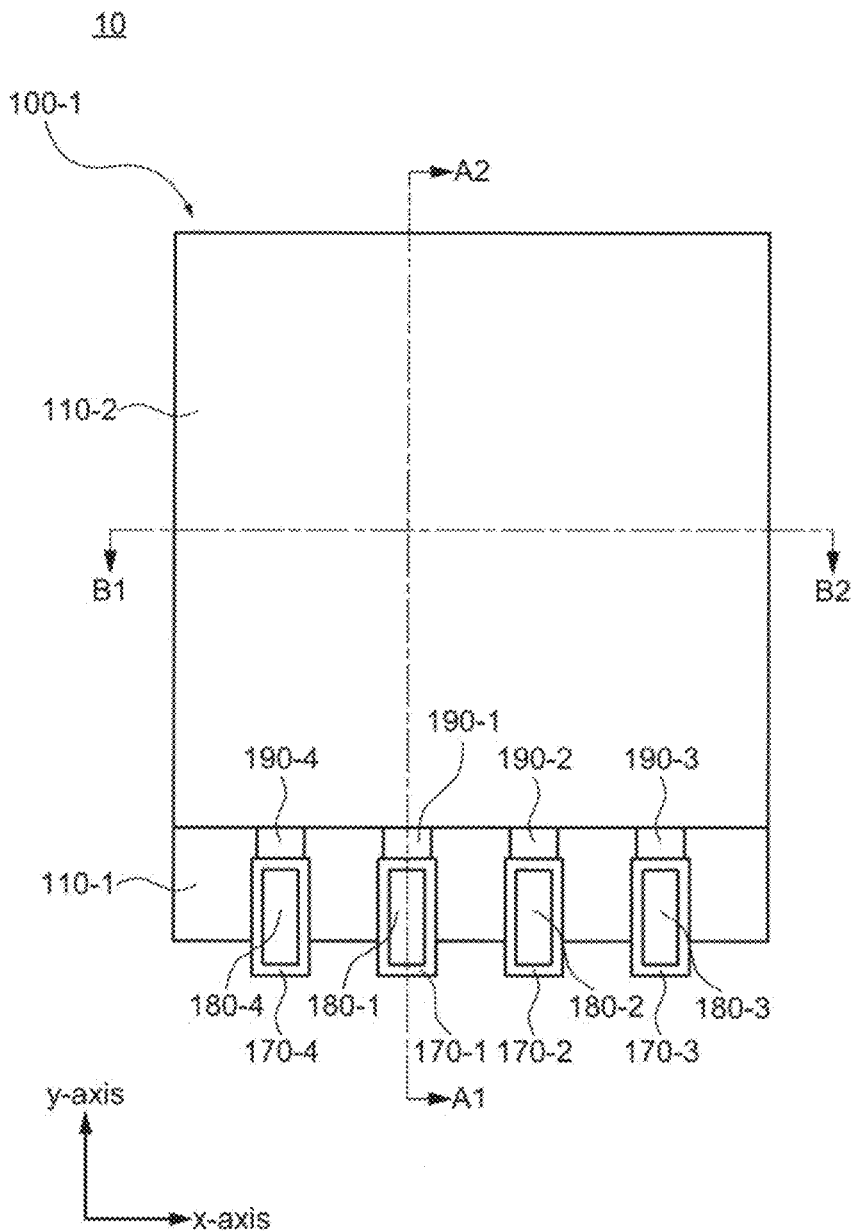
FIG. 1B is a schematic top view of an optical element according to an embodiment of the present invention (First Embodiment)
Figure 1C:
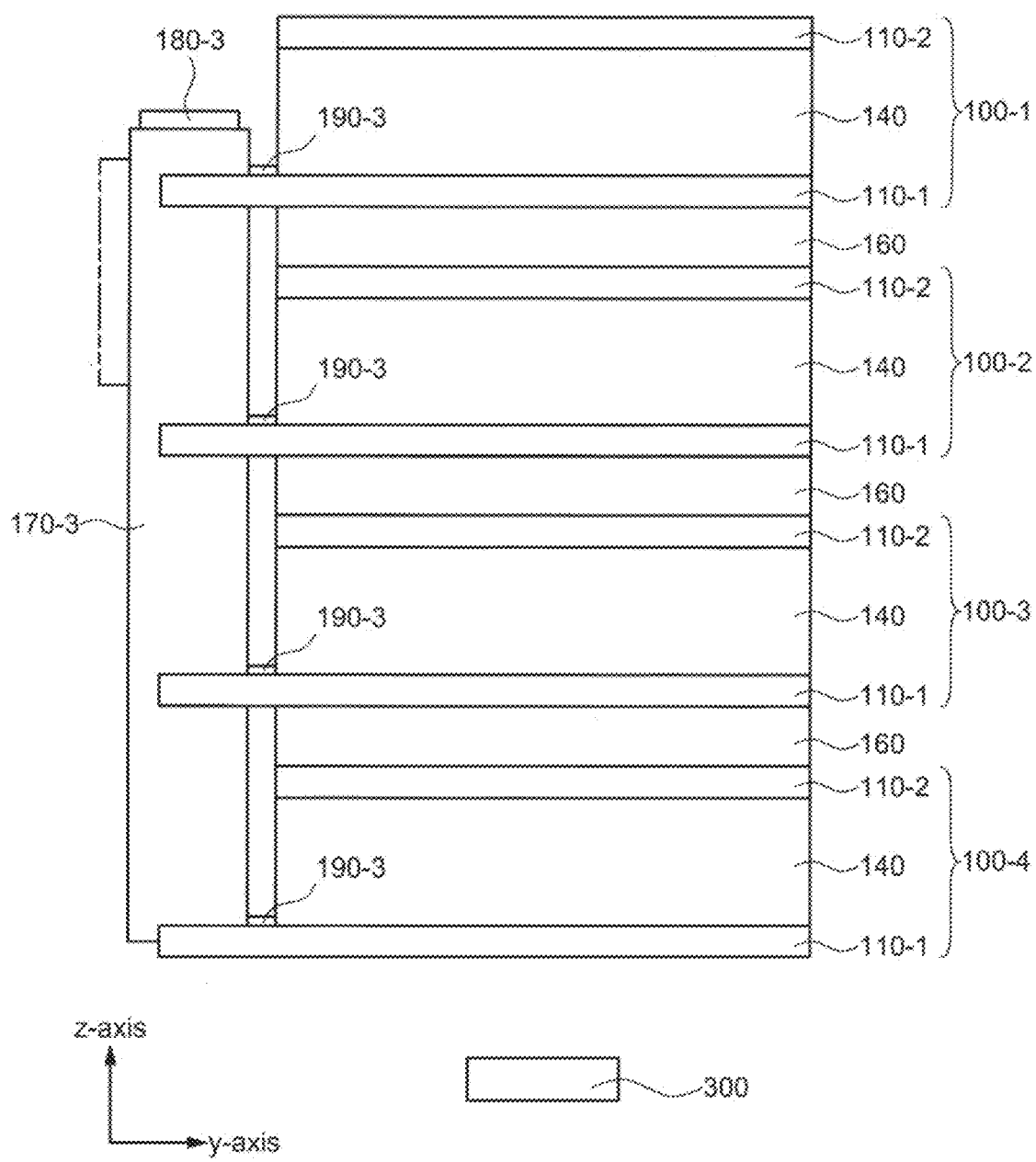
FIG. 1C is a schematic side view of an optical element according to an embodiment of the present invention (First Embodiment).

FIGS. 1A, 1B, and 1C are respectively a schematic perspective view, a top view, and a side view of an optical element 10 according to an embodiment of the present invention. As shown in FIGS. 1A and 1C, the optical element 10 includes four liquid crystal cells 100 (a first liquid crystal cell 100-1, a second liquid crystal cell 100-2, a third liquid crystal cell 100-3, and a fourth liquid crystal cell 100-4) stacked in a z-axis direction. That is, in the optical element 10, the first liquid crystal cell 100-1, the second liquid crystal cell 100-2, the third liquid crystal cell 100-3, and the fourth liquid crystal cell 100-4 are stacked in order in the z-axis direction. Further, the first liquid crystal cell 100-1, the second liquid crystal cell 100-2, the third liquid crystal cell 100-3, and the fourth liquid crystal cell 100-4 overlap each other. In the following description, when the top-bottom relationship of the optical element 10 is described, it may be described that the first liquid crystal cell 100-1 is located on the top side and the fourth liquid crystal cell 100-4 is located on the bottom side. Further, in the following description, the z-axis direction may be described as the stacking direction.

Although FIGS. 1A and 1C show the four liquid crystal cells 100, the number of liquid crystal cells 100 included in the optical element 10 is not limited thereto. The number of liquid crystal cells 100 included in the optical element 10 is preferably an even number, and may be two, or greater than or equal to six. However, since an increase in the number of liquid crystal cells 100 reduces the transmittance, the number of liquid crystal cells 100 is preferably less than or equal to six, and is particularly preferably four.

Two adjacent liquid crystal cells 100 are bonded to each other via an optical elastic resin layer 160. For example, an adhesive containing an acrylic resin or an epoxy resin having a light transmission property can be used as the optical elastic resin layer 160. Further, the liquid crystal cell 100 has a structure in which two substrates 110 (a first substrate 110-1 and a second substrate 110-2) are bonded to each other with a sealing member 140.

The first substrate 110-1 is larger than the second substrate 110-2. That is, as shown in FIGS. 1B and 1C, the length of the first substrate 110-1 is longer than the length of the second substrate 110-2 in a y-axis direction. In other words, the liquid crystal cell 100 has one side from which an end portion of the first substrate 110-1 protrudes. Four pads 190 (a first pad 190-1, a second pad 190-2, a third pad 190-3, and a fourth pad 190-4) are provided on the end portion of the first substrate 110-1.

The first pads 190-1 of the four liquid crystal cells 100 are electrically connected via a first inter-cell conductive member 170-1 extending in the z-axis direction. Similarly, the second pads 190-2 are electrically connected via a second inter-cell conductive member 170-2 extending in the z-axis direction, the third pads 190-3 are electrically connected via a third inter-cell conductive member 170-3 extending in the z-axis direction, and the fourth pads 190-4 are electrically connected via a fourth inter-cell conductive member 170-4 extending in the z-axis direction. In addition, the four inter-cell conductive members 170 (the first inter-cell conductive member 170-1, the second inter-cell conductive member 170-2, the third inter-cell conductive member 170-3, and the fourth inter-cell conductive member 170-4) are not electrically connected to each other.

A first pad portion 180-1, a second pad portion 180-2, a third pad portion 180-3, and a fourth pad portion 180-4 are provided on the upper ends of the first inter-cell conductive member 170-1, the second inter-cell conductive member 170-2, the third inter-cell conductive member, and the fourth inter-cell conductive member 170-4, respectively. The first pad portion 180-1 may be provided so as to cover a part of a surface of the upper end of the first inter-cell conductive member 170-1. The second pad portion 180-2, the third pad portion 180-3, and the fourth pad portion 180-4 may also have a similar configuration as the first pad portion 180-1. A flexible printed circuit (FPC) can be connected to the four pad portions 180 (the first pad portion 180-1, the second pad portion 180-2, the third pad portion 180-3, and the fourth pad portion 180-4). That is, the optical element 10 can be controlled by inputting signals via the FPC connected to the pad portions 180. In addition, signals can also be input to the pad portions 180 without connecting the FPC to the pad portions 180.

Figure 2A:
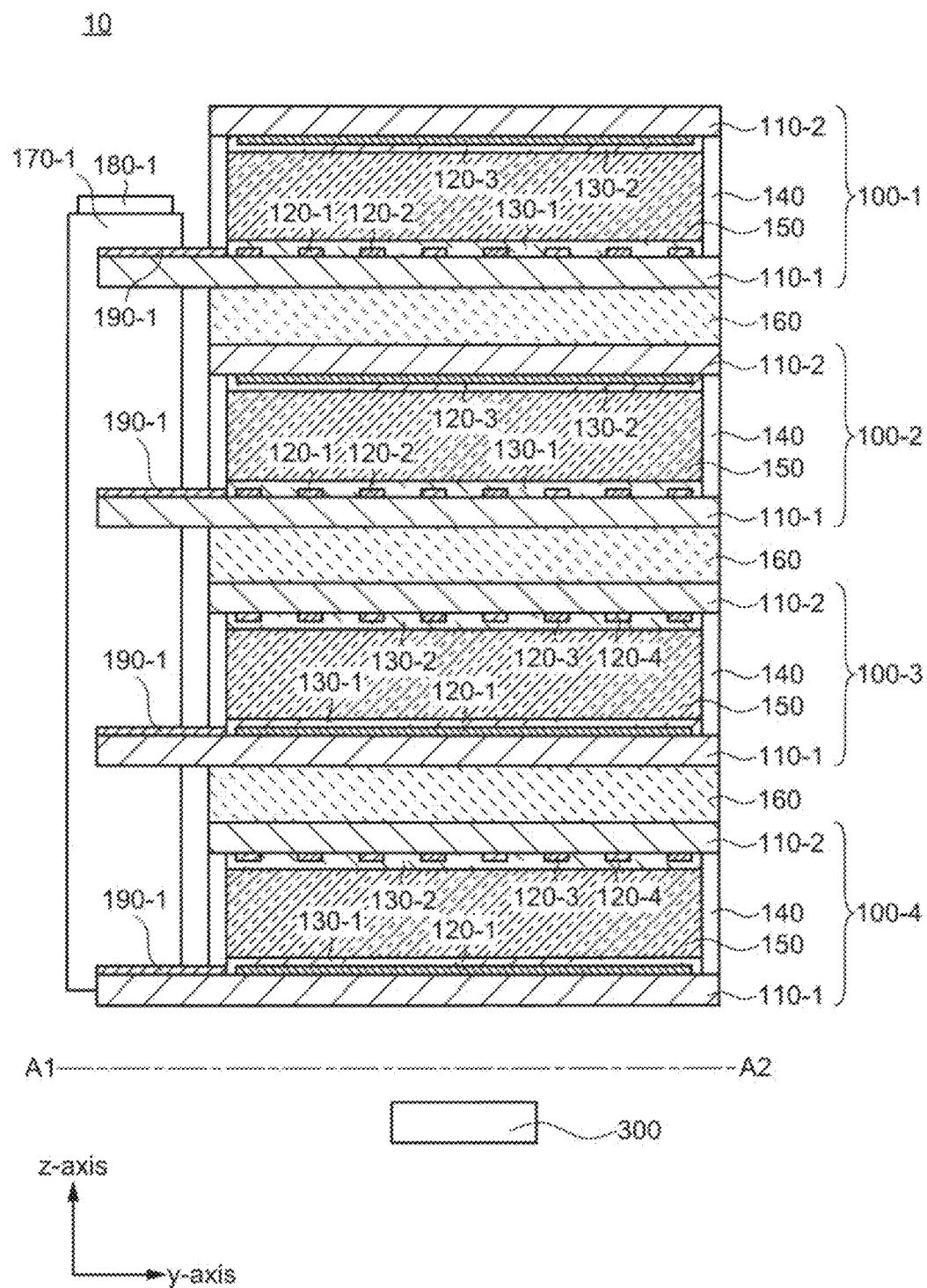
FIG. 2A is a schematic cross-sectional view of an optical element according to an embodiment of the present invention (First Embodiment).
Figure 2B:
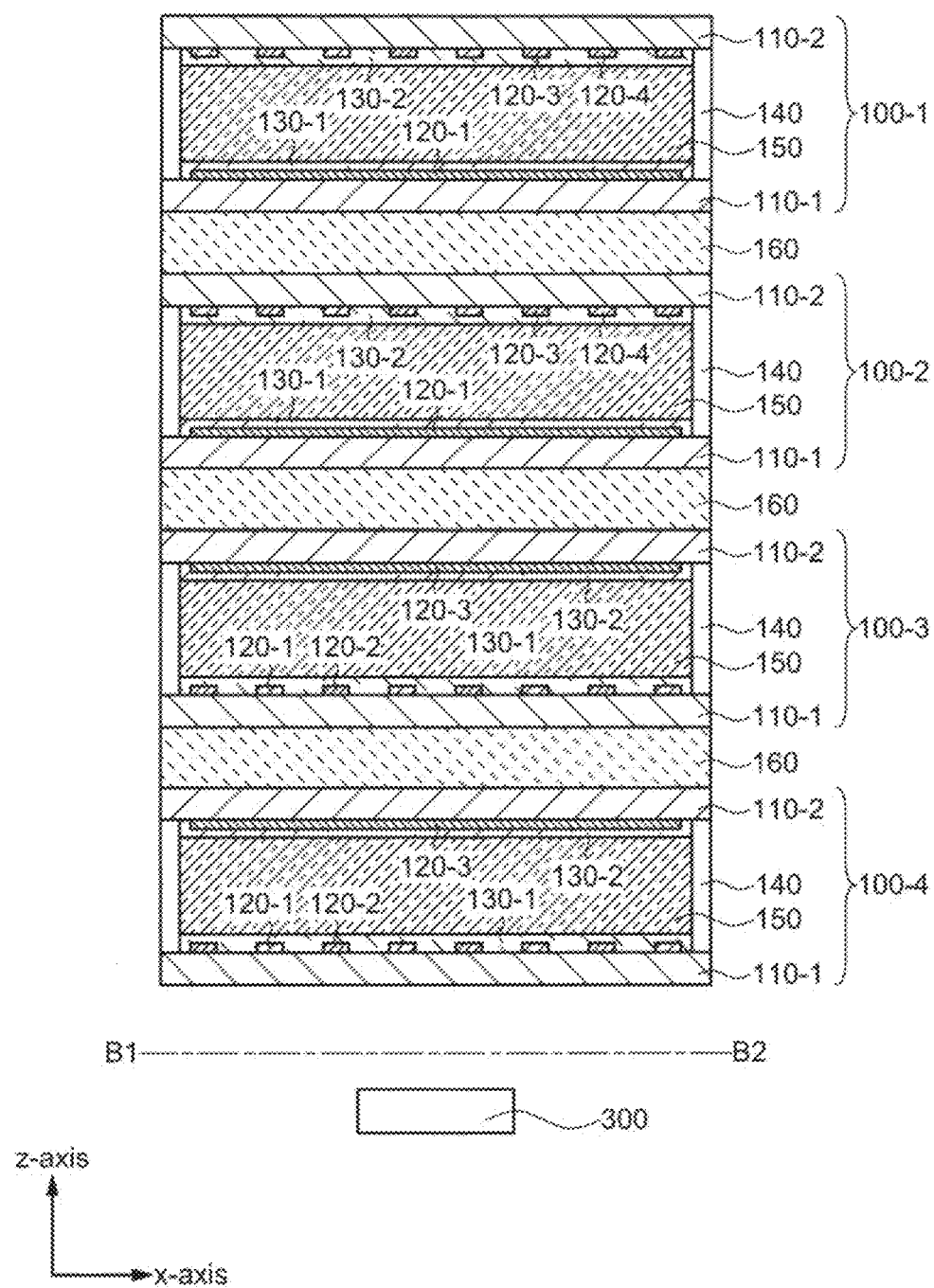
FIG. 2B is a schematic cross-sectional view of an optical element according to an embodiment of the present invention (First Embodiment).

FIGS. 2A and 2B are schematic cross-sectional views of an optical element 10 according to an embodiment of the present invention. Specifically, FIG. 2A is a schematic cross-sectional view of the optical element 10 in a yz plane cut along the line A1-A2 in FIG. 1B, and FIG. 2B is a schematic cross-sectional view of the optical element 10 in a zx plane cut along the line B1-B2 in FIG. 1B. In the following description, an x-axis direction and a y-axis direction may be described as the first direction and the second direction, respectively. That is, the second direction is a direction orthogonal to the first direction.

As shown in FIGS. 2A and 2B, each of the four liquid crystal cells 100 includes not only a first substrate 110-1, a second substrate 110-2, and a sealant 140, but also a first transparent electrode 120-1, a second transparent electrode 120-2, a third transparent electrode 120-3, a fourth transparent electrode 120-4, a first alignment film 130-1, a second alignment film 130-2, and a liquid crystal layer 150. The first transparent electrode 120-1, the second transparent electrode 120-2, and the first alignment film 130-1 covering the first transparent electrode 120-1 and the second transparent electrode 120-2 are provided on the first substrate 110-1. Further, the third transparent electrode 120-3, the fourth transparent electrode 120-4, and the second alignment film 130-2 covering the third transparent electrode 120-3 and the fourth transparent electrode 120-4 are provided on the second substrate 110-2. The first substrate 110-1 and the second substrate 110-2 are arranged so that the first transparent electrode 120-1 and the second transparent electrode 120-2 on the first substrate 110-1 face the third transparent electrode 120-3 and the fourth transparent electrode 120-4 on the second substrate 110-2. The first substrate 110-1 and the second substrate 110-2 are bonded to each other via a sealing member 140 provided on the peripheries of the first substrate 110-1 and the second substrate 110-2. However, the end portion of the first substrate 110-1 on which the pads 190 are provided is located outside an area surrounded by the sealing member 140. Further, the liquid crystal layer 150 is provided between the first substrate 110-1 and the second substrate 110-2 by sealing a liquid crystal in a space surrounded by the first substrate 110-1 (more specifically, the first alignment film 130-1), the second substrate 110-2 (more specifically, the second alignment film 130-2), and the sealing member 140. In addition, the first substrate 110-1 and the second substrate 110-2 may be bonded to each other with dispersing spacers or forming photospacers on the first substrate 110-1 or the second substrate 110-2. In this case, the gap of the liquid crystal layer 150 can be maintained by the spacers or the photospacers.

For example, a rigid substrate having light-transmitting properties such as a glass substrate, a quartz substrate, or a sapphire substrate is used as each of the first substrate 110-1 and the second substrate 110-2. Further, a flexible substrate having light-transmitting properties such as a polyimide resin substrate, an acrylic resin substrate, a siloxane resin substrate, or a fluorine resin substrate can also be used as each of the first substrate 110-1 and the second substrate 110-2.

Each of the first transparent electrode 120-1, the second transparent electrode 120-2, the third transparent electrode 120-3, and the fourth transparent electrode 120-4 functions as an electrode for forming an electric field in the liquid crystal layer 150. For example, a transparent conductive material such as indium tin oxide (ITO) or indium zinc oxide (IZO) is used for each of the first transparent electrode 120-1, the second transparent electrode 120-2, the third transparent electrode 120-3, and the fourth transparent electrode 120-4.

The liquid crystal layer 150 can refract transmitted light or change the polarization state of transmitted light according to the alignment state of the liquid crystal molecules. For example, nematic liquid crystal can be used as the liquid crystal of the liquid crystal layer 150. Although a positive liquid crystal is described as the liquid crystal in the present embodiment, a negative liquid crystal can also be adopted by changing the initial alignment directions of the liquid crystal molecules. Further, the liquid crystal preferably contains a chiral agent that imparts twist to the liquid crystal molecules.

Each of the first alignment film 130-1 and the second alignment film 130-2 aligns the liquid crystal molecules in the liquid crystal layer 150 in a predetermined direction. For example, a polyimide resin or the like can be used for each of the first alignment film 130-1 and the second alignment film 130-2. In addition, each of the first alignment film 130-1 and the second alignment film 130-2 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

An adhesive material containing epoxy resin, acrylic resin, or the like can be used for the sealing member 140. The adhesive material may be of an ultraviolet curable type or a heat curable type.

As described above, the four pads 190 are provided on the first substrate 110-1. The pads 190 may be made of the same material as the first transparent electrode 120-1 and the second transparent electrode 120-2. That is, the pads 190 may be in the same layer as the first transparent electrode 120-1 and the second transparent electrode 120-2. Further, not only a transparent conductive material but also a metal material may be used for the pads 190. Furthermore, the pads 190 may have not only a single-layer structure but also a laminated structure (for example, a laminated structure of a transparent conductive material and a metal material).

As described above, the four first pads 190-1 included in the four liquid crystal cells 100 are electrically connected via the first inter-cell conductive member 170-1. The first inter-cell conductive member 170-1 extends in the z-axis direction so as to cover at least the surfaces of the end portions of the first substrates 110-1 of the first liquid crystal cell 100-1, the second liquid crystal cell 100-2, and the third liquid crystal cell 100-3. The second inter-cell conductive member 170-2, the third inter-cell conductive member 170-3, and the fourth inter-cell conductive member 170-4 have the same configuration as the first inter-cell conductive member 170-1. For example, a conductive adhesive containing a conductive filler can be used for the inter-cell conductive member 170. For example, silver or carbon can be used for the conductive filler.

Further, as described above, the first pad portion 180-1 is provided on the upper end of the first inter-cell conductive member 170-1. The second pad portion 180-2, the third pad portion 180-3, and the fourth pad portion 180-4 have the same configuration as the first inter-cell conductive member 170-1. For example, solder or the like can be used as the pad portion 180. In addition, a configuration in which the pad portion 180 is provided on an outer side surface of the inter-cell conductive member 170 can also be adopted as shown by the two-dot chain line in FIG. 1C. In this case, the pad portion 180 is provided in a direction orthogonal to the first substrate 110-1 of each of the liquid crystal cells 100. The position of the pad portion 180 can be any position as long as it is on the outer side surface of the inter-cell conductive member 170. Although the pad portion 180 can be provided at a position facing the first liquid crystal cell 100-1, the pad portion 180 can also be provided at a position facing the second liquid crystal cell 100-2 to the fourth liquid crystal cell 100-4. Further, the pad portion 180 may have a length that crosses a plurality of liquid crystal cells 100.

As described above, in the optical element 10, the pads 190 are provided on each of the plurality of liquid crystal cells 100, and the pads 190 of the plurality of liquid crystal cells 100 are electrically connected via the inter-cell conductive members 170 extending in the z-axis direction. Although the details are described later, one pad 190 is electrically connected to one of the first transparent electrode 120-1, the second transparent electrode 120-2, the third transparent electrode 120-3, and the fourth transparent electrode 120-4. Therefore, in the optical element 10, a potential corresponding to the signal can be applied to the transparent electrodes 120 of the plurality of liquid crystal cells 100 by inputting a signal through the inter-cell conductive member 170. Further, when the FPC is connected to the pad portion 180, the number of FPCs can be reduced, and therefore manufacturing costs can be suppressed.

In addition, the light source 300 is arranged below the optical element 10, and light emitted from the light source 300 passes through the fourth liquid crystal cell 100-4, the third liquid crystal cell 100-3, the second liquid crystal cell 100-2, and the first liquid crystal cell 100-1 in this order. At this time, the shape of the light transmitted through the liquid crystal cell 100 is changed by controlling the potentials applied to the transparent electrodes 120. Therefore, the shape of the light transmitted through the optical element 10 can be distributed in any shape by controlling the potentials applied to the transparent electrodes 120.

[2. Optical Property of Liquid Crystal Cell 100]

Figure 3A:
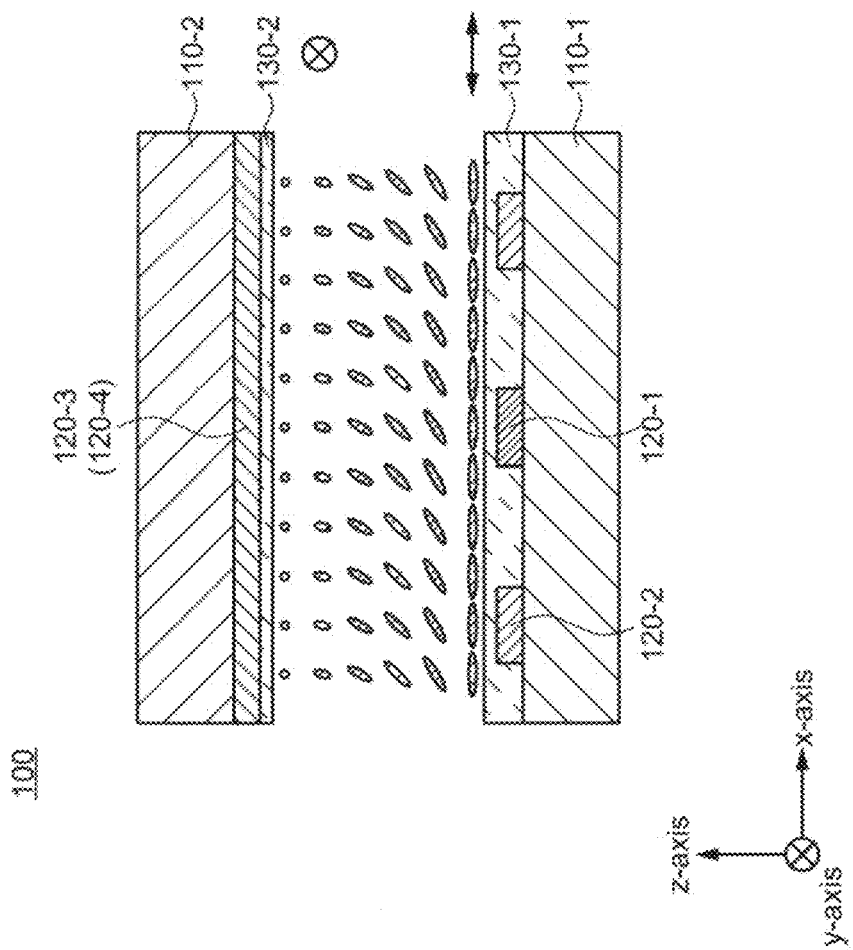
FIG. 3A is a schematic cross-sectional view illustrating an optical property of a liquid crystal cell of an optical element according to an embodiment of the present invention (First Embodiment).
Figure 3B:
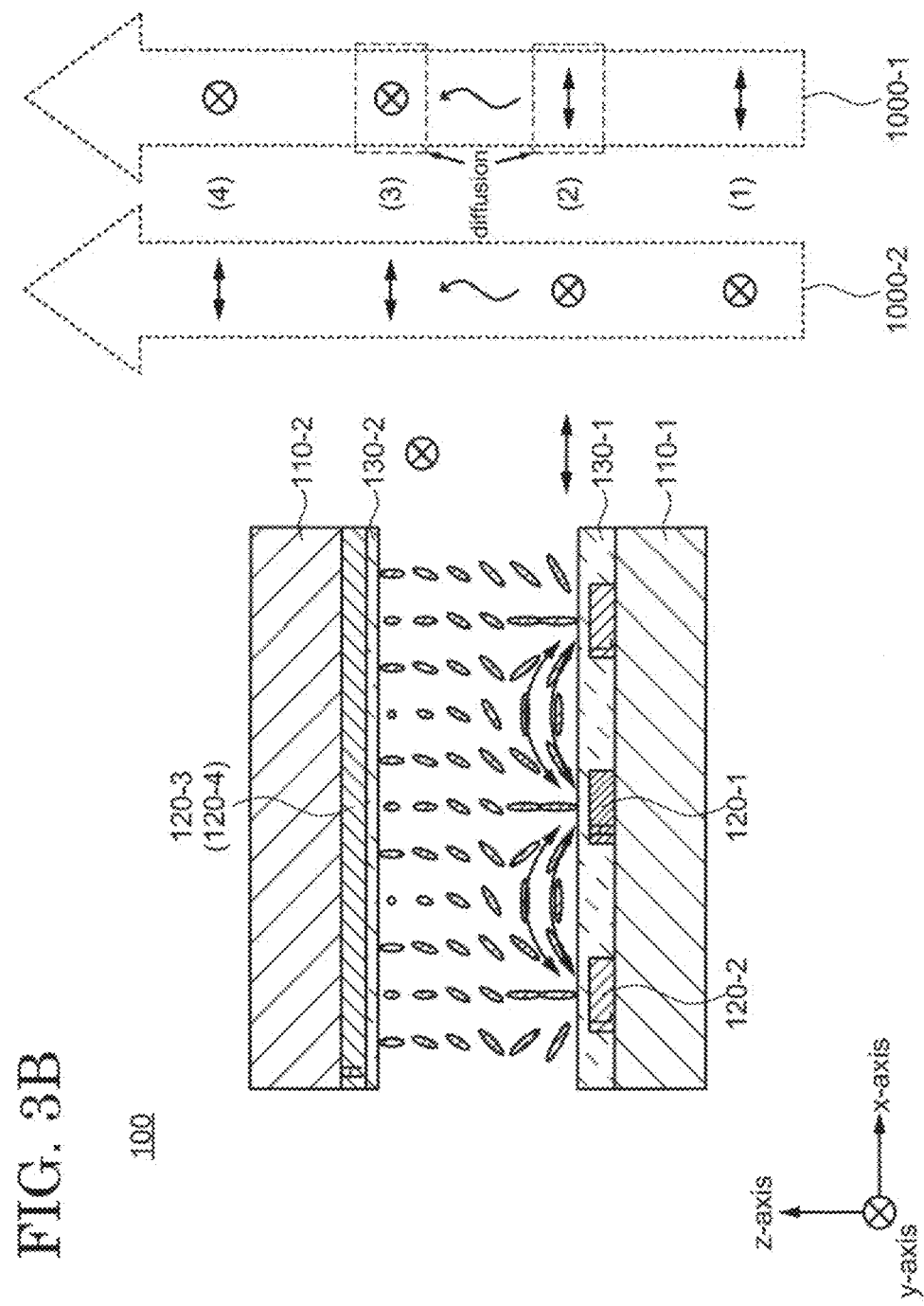
FIG. 3B is a schematic cross-sectional view illustrating an optical property of a liquid crystal cell of an optical element according to an embodiment of the present invention (First Embodiment).

FIGS. 3A and 3B are schematic cross-sectional views illustrating an optical property of the liquid crystal cell 100 of the optical element 10 according to an embodiment of the present invention. In the liquid crystal cell 100 shown in FIGS. 3A and 3B, the first transparent electrode 120-1 and the second transparent electrode 120-2 extend in the y-axis direction, and the third transparent electrode 120-3 and the fourth transparent electrode 120-4 extend in the x-axis direction.

FIG. 3A shows the liquid crystal cell 100 in a state where no potentials are applied to the transparent electrodes 120. The first alignment film 130-1 is aligned in the x-axis direction. Therefore, the liquid crystal molecules on the first alignment film 130-1 are aligned with their long axes along the x-axis direction. In other words, the initial alignment direction of the liquid crystal molecules closer to the first substrate 110-1 is the x-axis direction. The second alignment film 130-2 is aligned in the y-axis direction. Therefore, the liquid crystal molecules on the second alignment film 130-2 are aligned along the y-axis direction. In other words, the initial alignment direction of the liquid crystal molecules closer to the second substrate 110-2 is the y-axis direction. In this way, when the initial alignment directions of the liquid crystal molecules between the substrates 110 of the liquid crystal cell 100 are crossed (or the alignment directions of the alignment film 130 are crossed), the liquid crystal molecules in the liquid crystal layer 150 rotate little by little continuously from the first substrate 110-1 to the second substrate 110-2 when viewed in the thickness direction (z-axis direction) of the liquid crystal layer 150, and change the direction of the long axis from the x-axis direction to the y-axis direction. In the following description, when the liquid crystal layer 150 is in such a state, the liquid crystal layer 150 is said to be in a twisted state. In this case, the polarization axis of the light transmitted through the liquid crystal layer 150 is rotated from the x-axis direction to the y-axis direction according to the alignment directions of the liquid crystal molecules. That is, the polarization component of the light transmitted through the liquid crystal layer 150 is rotated. In other words, the light transmitted through the liquid crystal layer 150 has optical rotation.

FIG. 3B shows the liquid crystal cell 100 in FIG. 3A in a state where potentials are applied to the transparent electrodes 120. For example, a high potential (H) is applied to the first transparent electrode 120-1 and the third transparent electrode 120-3, and a low potential (L) is applied to the second transparent electrode 120-2 and the fourth transparent electrode 120-4. That is, potentials are applied so that a potential difference is generated between two adjacent transparent electrodes 120. In the following description, the electric field generated between two adjacent transparent electrodes 120 may be referred to as a lateral electric field.

The liquid crystal molecules closer to the first substrate 110-1 are aligned in a convex arc shape along the y-axis direction with respect to the first substrate 110-1 by the influence of the lateral electric field between the first transparent electrode 120-1 and the second transparent electrode 120-2. Further, the liquid crystal molecules closer to the second substrate 110-2 are aligned in a convex arc shape along the x-axis direction with respect to the second substrate 110-2 by the influence of the lateral electric field between the third transparent electrode 120-3 and the fourth transparent electrode 120-4. At this time, the alignment directions of the liquid crystal molecules in the center between the first substrate 110-1 and the second substrate 110-2 (the liquid crystal molecules located closer to the top portion when aligned in the convex arc shape described above) are hardly changed by any lateral electric field. In addition, since the first substrate 110-1 and the second substrate 110-2 have a sufficiently large inter-substrate distance, the lateral electric field between the first transparent electrode 120-1 and the second transparent electrode 120-2 on the first substrate 110-1 does not affect the alignment of the liquid crystal molecules on the side of the second substrate 110-2, or is negligibly small. Similarly, the lateral electric field between the third transparent electrode 120-3 and the fourth transparent electrode 120-4 on the second substrate 110-2 does not affect the alignment of the liquid crystal molecules on the side of the first substrate 110-1, or is negligibly small. Therefore, the liquid crystal molecules, which are in a twisted state before the lateral electric field is generated, are maintained in the twisted state after the lateral electric field is generated, and are given a refractive index distribution, as shown in FIG. 3B. In this case, the light transmitted through the liquid crystal layer 150 has optical rotation while diffusing the polarization component parallel to the alignment of the liquid crystal molecules.

Further, the details of the case where light is transmitted through the liquid crystal cell 100 shown in FIG. 3B. are described. Light emitted from the light source 300 has a polarization component in the x-axis direction (hereinafter, referred to as "P-polarization component") and a polarization component in the y-axis direction (hereinafter, referred to as "S-polarization component"). However, for convenience, the polarization component of the light is divided into the P-polarization component and the S-polarization component in the following description. That is, the light emitted from the light source 300 includes a first polarized light 1000-1 having the P-polarization component and a second polarized light 1000-2 having the S-polarization component (see (1) in FIG. 3B).

In FIG. 3B, since the first polarized light 1000-1 incident on the liquid crystal cell 100 has the same polarization component as the alignment directions of the liquid crystal molecules on the side of the first substrate 110-1, the first polarized light 1000-1 is diffused according to the refractive index distribution of the liquid crystal molecules (see (2) in FIG. 3B). When the first polarized light 1000-1 travels from the first substrate 110-1 to the second substrate 110-2, the first polarized light 1000-1 undergoes optical rotation, and its polarization component changes from the P-polarization component to the S-polarization component. Since the first polarized light 1000-1 having the S-polarization component has the same polarization component as the alignment directions of the liquid crystal molecules on the side of the second substrate 110-2, the first polarized light 1000-1 is diffused according to the refractive index distribution of the liquid crystal molecules (see (3) in FIG. 3B). Further, the first polarized light 1000-1 emitted from the liquid crystal cell 100 has the S-polarization component (see (4) in FIG. 3B).

On the other hand, since the second polarized light 1000-2 incident on the liquid crystal cell 100 has a different polarization component from the alignment directions of the liquid crystal molecules on the side of the first substrate 110-1, the second polarized light 1000-2 is not diffused (see (2) in FIG. 3B). When the second polarized light 1000-2 travels from the first substrate 110-1 to the second substrate 110-2, the second polarized light 1000-2 undergoes optical rotation, and its polarization component changes from the S-polarization component to the P-polarization component. Since the second polarized light 1000-2 having the P-polarization component has a different polarization component from the alignment directions of the liquid crystal molecules on the side of the second substrate 110-2, the second polarized light 1000-2 is not diffused (see (3) in FIG. 3B). Further, the second polarized light 1000-2 emitted from the liquid crystal cell 100 has the P-polarization component (see (4) in FIG. 3B).

As described above, the shape of the light transmitted through the liquid crystal cell 100 changes by controlling the potentials applied to the transparent electrodes 120 in the liquid crystal cell 100. Therefore, by controlling the potentials applied to the transparent electrode 120, the shape of the light transmitted through the optical element 10 can be distributed in any shape.

[3. Electrode Pattern of Liquid Crystal Cell 100]

Figure 4A:
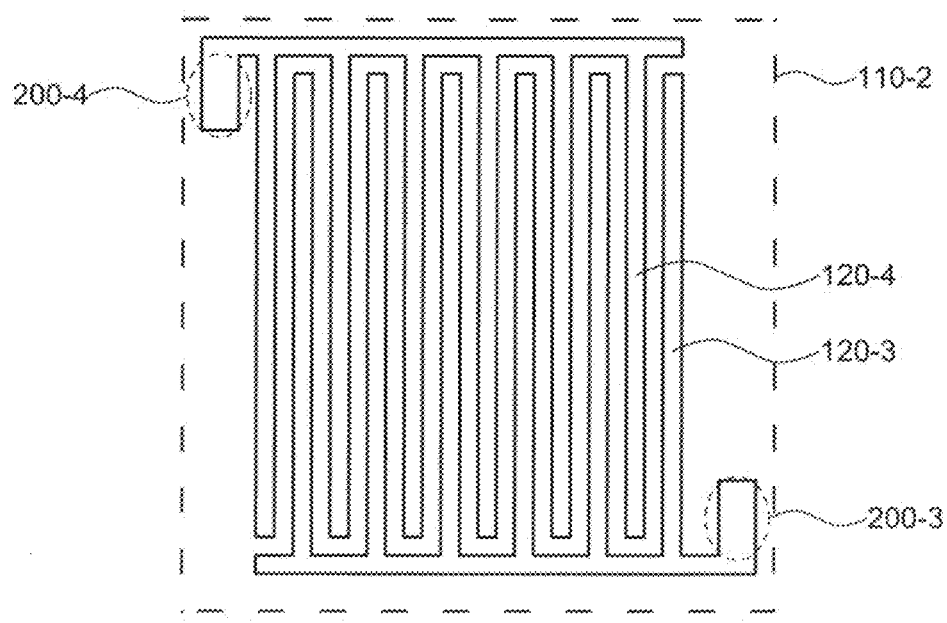
FIG. 4A is a schematic diagram illustrating electrode patterns of a liquid crystal cell of an optical element according to an embodiment of the present invention (First Embodiment).
Figure 4A:
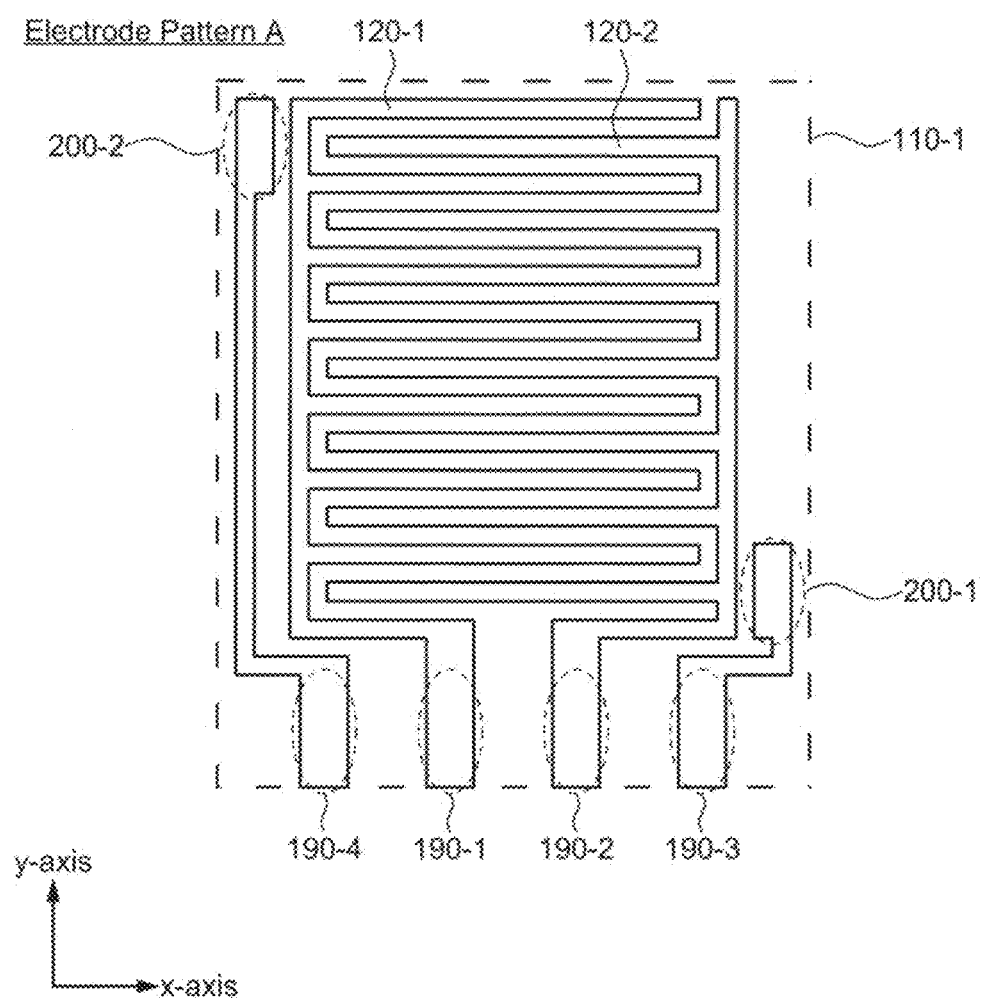
Figure 4B:
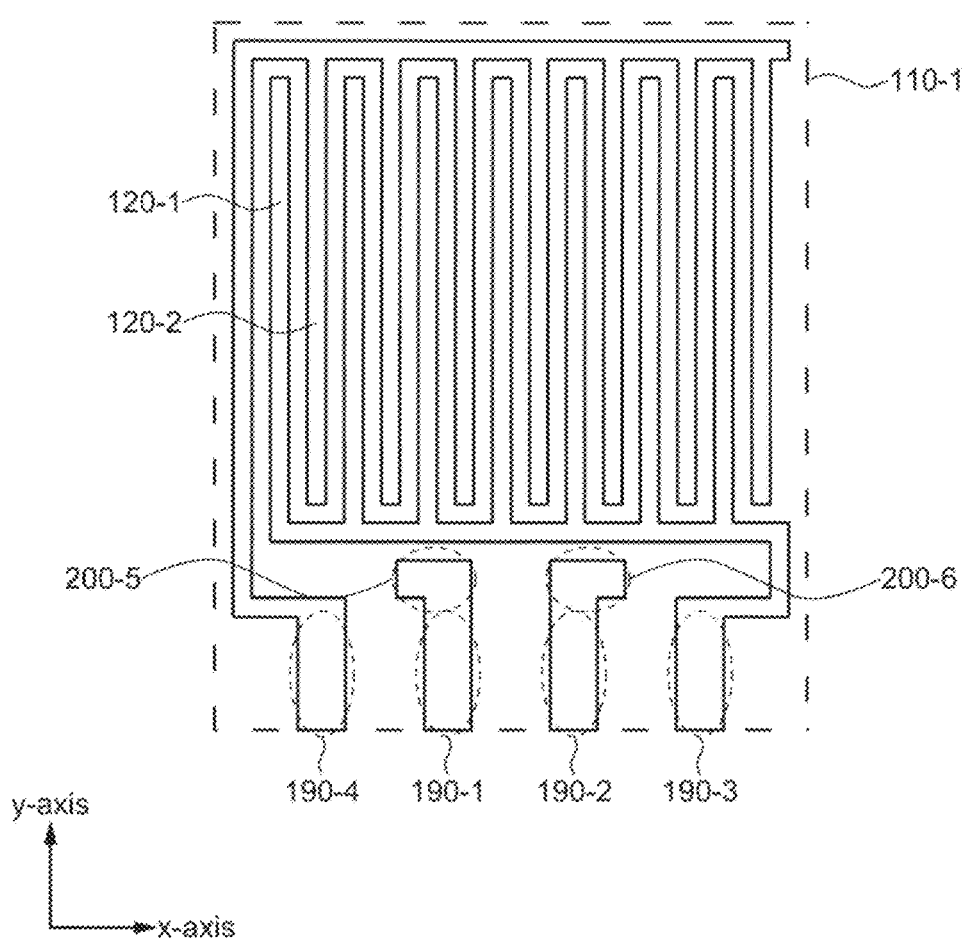
FIG. 4B is a schematic diagram illustrating electrode patterns of a liquid crystal cell of an optical element according to an embodiment of the present invention (First Embodiment).

Each of FIGS. 4A and 4B is a schematic diagram illustrating electrode patterns of the liquid crystal cell 100 of the optical element 10 according to an embodiment of the present invention. Specifically, FIG. 4A shows a schematic diagram of an electrode pattern A on the first substrate 110-1 and an electrode pattern B on the second substrate 110-2 in each of the first liquid crystal cell 100-1 and the second liquid crystal cell 100-2, and FIG. 4B shows a schematic diagram of an electrode pattern C on the first substrate 110-1 and an electrode pattern D on the second substrate 110-2 in each of the third liquid crystal cell 100-3 and the fourth liquid crystal cell 100-4.

The electrode pattern A has a pattern in which the plurality of first transparent electrodes 120-1 and the plurality of second transparent electrodes 120-2 extending in the x-axis direction are electrically connected to a first pad 190-1 and a second pad 190-2, respectively, provided at an end of the first substrate 110-1. The electrode pattern A also has a pattern in which a first connection region 200-1 and a second connection region 200-2 provided in the periphery of the first substrate 110-1 are electrically connected to a third pad 190-3 and a fourth pad 190-4, respectively, provided at an end portion of the first substrate 110-1. The third pad 190-3 and the fourth pad 190-4 are located outside the first pad 190-1 and the second pad 190-2. That is, the first pad 190-1 and the second pad 190-2 are located between the third pad 190-3 and the fourth pad 190-4.

The electrode pattern B has a pattern in which the plurality of third transparent electrodes 120-3 and the plurality of fourth transparent electrodes 120-4 extending in the y-axis direction are electrically connected to a third connection region 200-3 and a fourth connection region 200-4, respectively, provided in the periphery of the second substrate 110-2.

In each of the first liquid crystal cell 100-1 and the second liquid crystal cell 100-2, when the first substrate 110-1 and the second substrate 110-2 are bonded to each other, the first connection region 200-1 overlaps the third connection region 200-3, and the second connection region 200-2 overlaps the fourth connection region 200-4.

The electrode pattern C has a pattern in which the plurality of first transparent electrodes 120-1 and the plurality of second transparent electrodes 120-2 extending in the y-axis direction are electrically connected to the third pad 190-3 and the fourth pad 190-4, respectively, provided at an end portion of the first substrate 110-1. The electrode pattern C also has a pattern in which a fifth connection region 200-5 and a sixth connection region 200-6 provided near the end portion of the first substrate 110-1 are electrically connected to the first pad 190-1 and the second pad 190-2, respectively, provided at the end portion of the first substrate 110-1.

The electrode pattern D has a pattern in which the plurality of third transparent electrodes 120-3 and the plurality of fourth transparent electrodes 120-4 extending in the x-axis direction are electrically connected to a seventh connection region 200-7 and an eighth connection region 200-8, respectively, provided in the periphery of the second substrate 110-2.

In each of the third liquid crystal cell 100-3 and the fourth liquid crystal cell 100-4, when the first substrate 110-1 and the second substrate 110-2 are bonded to each other, the fifth connection region 200-5 overlaps the seventh connection region 200-7, and the sixth connection region 200-6 overlaps the eighth connection region 200-8.

Figure 5:
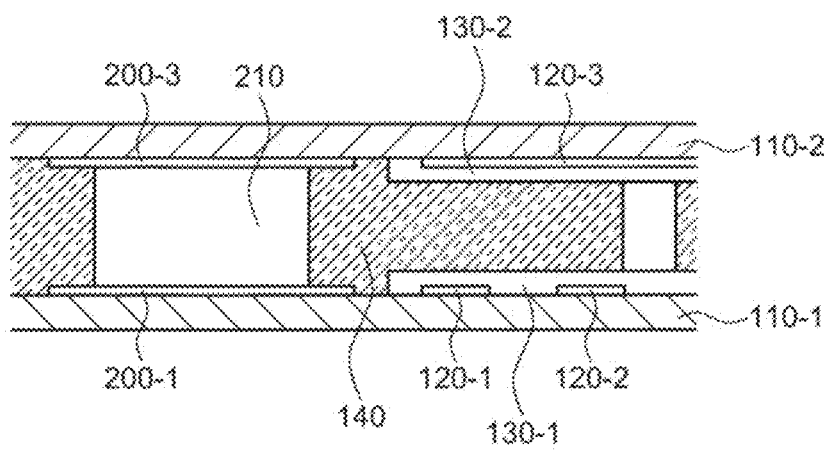
FIG. 5 is a schematic partial cross-sectional view of a first liquid crystal cell of an optical element according to an embodiment of the present invention (First Embodiment).

FIG. 5 is a schematic partial cross-sectional view of the first liquid crystal cell 100-1 of the optical element 10 according to an embodiment of the present invention. The third connection region 200-3 overlaps the first connection region 200-1 and is electrically connected to the first connection region 200-1 via a conductive paste 210. Similarly, the fourth connection region 200-4 overlaps the second connection region 200-2 and is electrically connected to the second connection region 200-2 via the conductive paste 210. The seventh connection region 200-7 overlapping the fifth connection region 200-5 and the eighth connection region 200-8 overlapping the sixth connection region 200-6 also have the same configuration.

Therefore, in each of the first liquid crystal cell 100-1 and the second liquid crystal cell 100-2, the first transparent electrode 120-1, the second transparent electrode 120-2, the third transparent electrode 120-3, and the fourth transparent electrode 120-4 are electrically connected to the first pad 190-1, the second pad 190-2, the third pad 190-3, and the fourth pad 190-4, respectively. On the other hand, in each of the third liquid crystal cell 100-3 and the fourth liquid crystal cell 100-4, the first transparent electrode 120-1, the second transparent electrode 120-2, the third transparent electrode 120-3, and the fourth transparent electrode 120-4 are electrically connected to the third pad 190-3, the fourth pad 190-4, the first pad 190-1, and the second pad 190-2, respectively.

As described above, the pads 190 of the four liquid crystal cells 100 are electrically connected to each other via the inter-cell conductive member 170. Therefore, in the optical element 10, a potential corresponding to a signal can be simultaneously applied to the first transparent electrode 120-1 of each of the first liquid crystal cell 100-1 and the second liquid crystal cell 100-2 and the third transparent electrode 120-3 of each of the third liquid crystal cell 100-3 and the fourth liquid crystal cell 100-4 by inputting the signal through the first inter-cell conductive member 170-1. Further, a potential corresponding to a signal can be simultaneously applied to the second transparent electrode 120-2 of each of the first liquid crystal cell 100-1 and the second liquid crystal cell 100-2 and the fourth transparent electrode 120-4 of each of the third liquid crystal cell 100-3 and the fourth liquid crystal cell 100-4 by inputting the signal through the second inter-cell conductive member 170-2. Furthermore, a potential corresponding to a signal can be simultaneously applied to the third transparent electrodes 120-3 of the first liquid crystal cell 100-1 and the second liquid crystal cell 100-2, and to the first transparent electrodes 120-1 of the third liquid crystal cell 100-3 and the fourth liquid crystal cell 100-4 by inputting the signal through the third inter-cell conductive member 170-3. Moreover, a potential corresponding to a signal can be simultaneously applied to the fourth transparent electrodes 120-4 of the first liquid crystal cell 100-1 and the second liquid crystal cell 100-2, and to the second transparent electrodes 120-2 of the third liquid crystal cell 100-3 and the fourth liquid crystal cell 100-4 by inputting the signal through the fourth inter-cell conductive member 170-4.

As described above, in the optical element 10, a potential corresponding to a signal can be simultaneously applied to the transparent electrodes 120 of the plurality of liquid crystal cells 100 by inputting the signal through each of the four inter-cell conductive members 170. Therefore, in the optical element 10, it is sufficient that one FPC is connected to the pad portion 180 provided on the upper end of the inter-cell conductive member 170, and the electrical connection in the mounting process can be simplified.

[4. Method for Fabricating Inter-cell Conductive Member 170]

Figure 6:
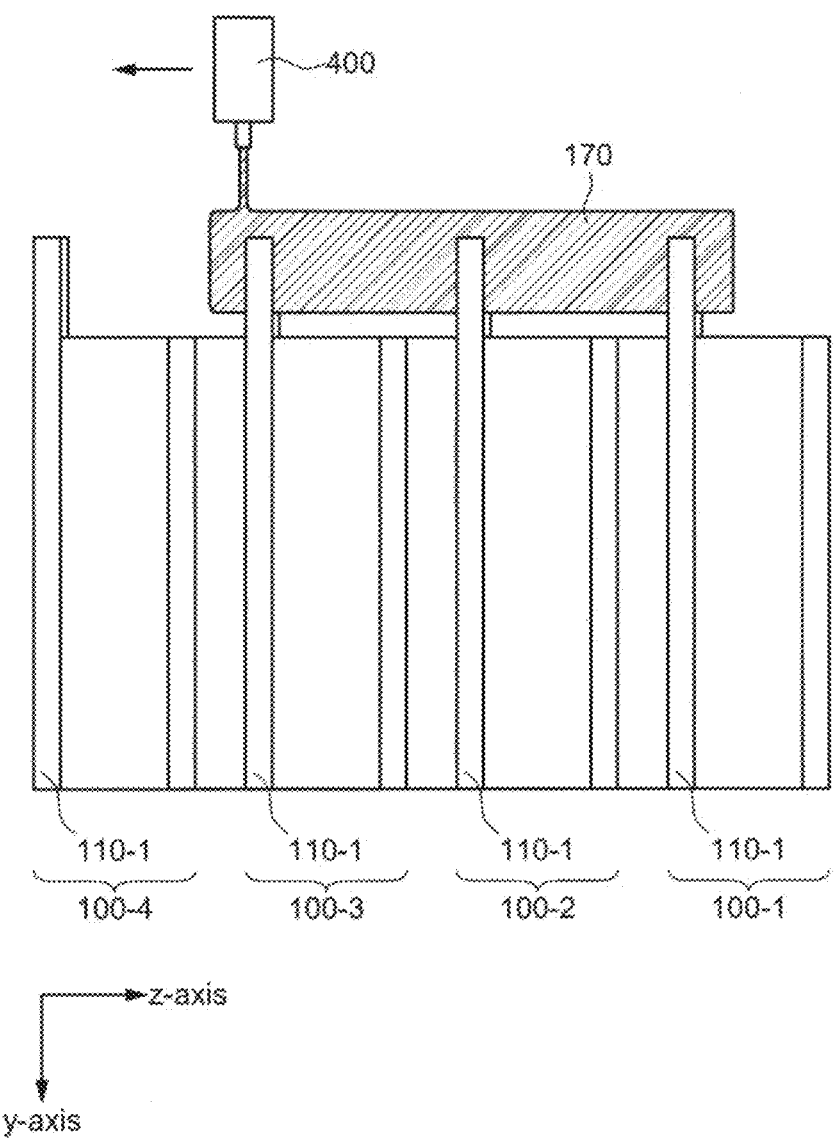
FIG. 6 is a schematic diagram illustrating a method for fabricating an inter-cell conductive member of an optical element according to an embodiment of the present invention (First Embodiment).

FIG. 6 is a schematic diagram illustrating a method for fabricating the inter-cell conductive member 170 of the optical element 10 according to an embodiment of the present invention.

As shown in FIG. 6, a dispenser 400 has a nozzle at its tip that projects a conductive adhesive. The dispenser 400 can send the conductive adhesive to the nozzle by pressure and eject the conductive adhesive from the nozzle. Therefore, the inter-cell conductive member 170 extending in the z-axis direction can be formed by moving the dispenser 400 in the z-axis direction while ejecting the conductive adhesive from the nozzle of the dispenser 400. The conductive adhesive ejected from the nozzle can also be inserted between two adjacent first substrates 110-1 by utilizing the capillary phenomenon.

As described above, the inter-cell conductive member 170 of the optical element 10 can be fabricated using a simple method. Therefore, since no large-scale capital investment is required, the optical element 10 can be manufactured inexpensively without increasing the production cost.

[5. Light Distribution Control of Optical Element 10]

Figure 7A:
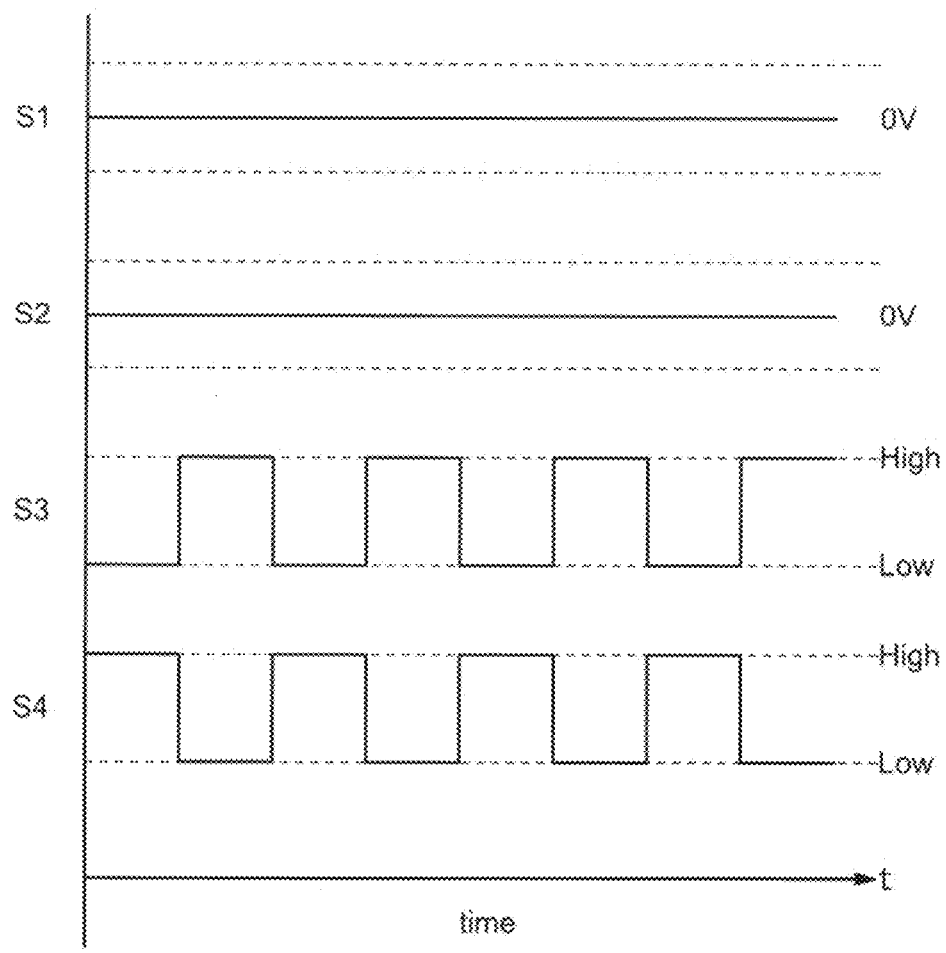
FIG. 7A is a timing chart showing signals input to inter-cell conductive members of an optical element according to an embodiment of the present invention (First Embodiment).
Figure 7B:
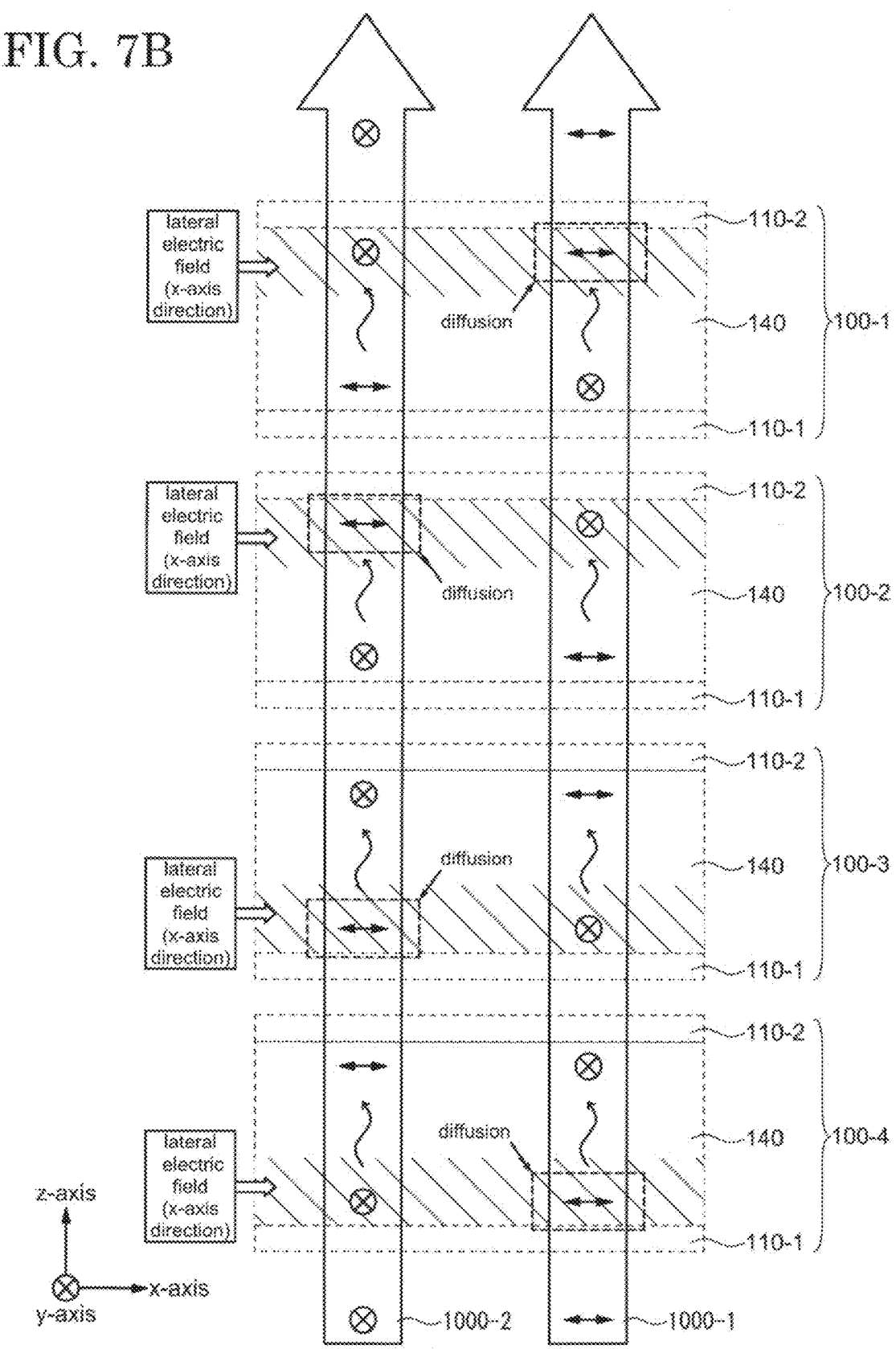
FIG. 7B is a schematic diagram illustrating a light distribution control of an optical element according to an embodiment of the present invention (First Embodiment).
Figure 7C:
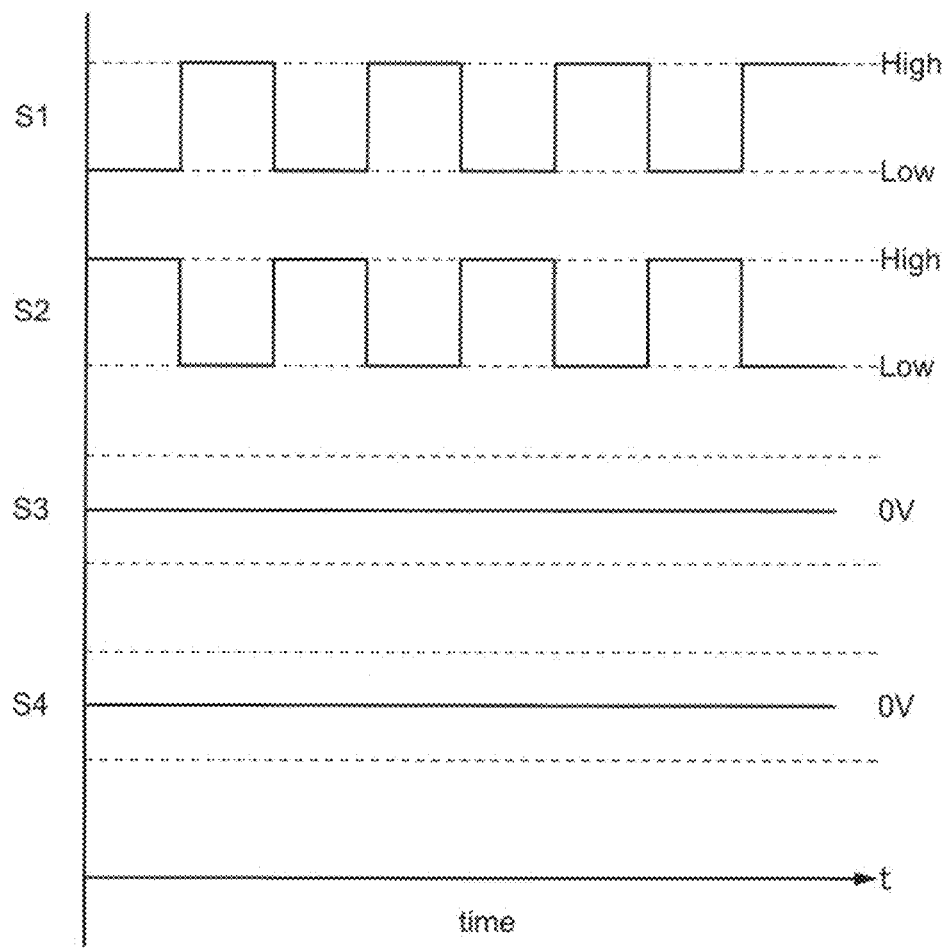
FIG. 7C is a timing chart showing signals input to inter-cell conductive members of an optical element according to an embodiment of the present invention (First Embodiment).
Figure 7D:
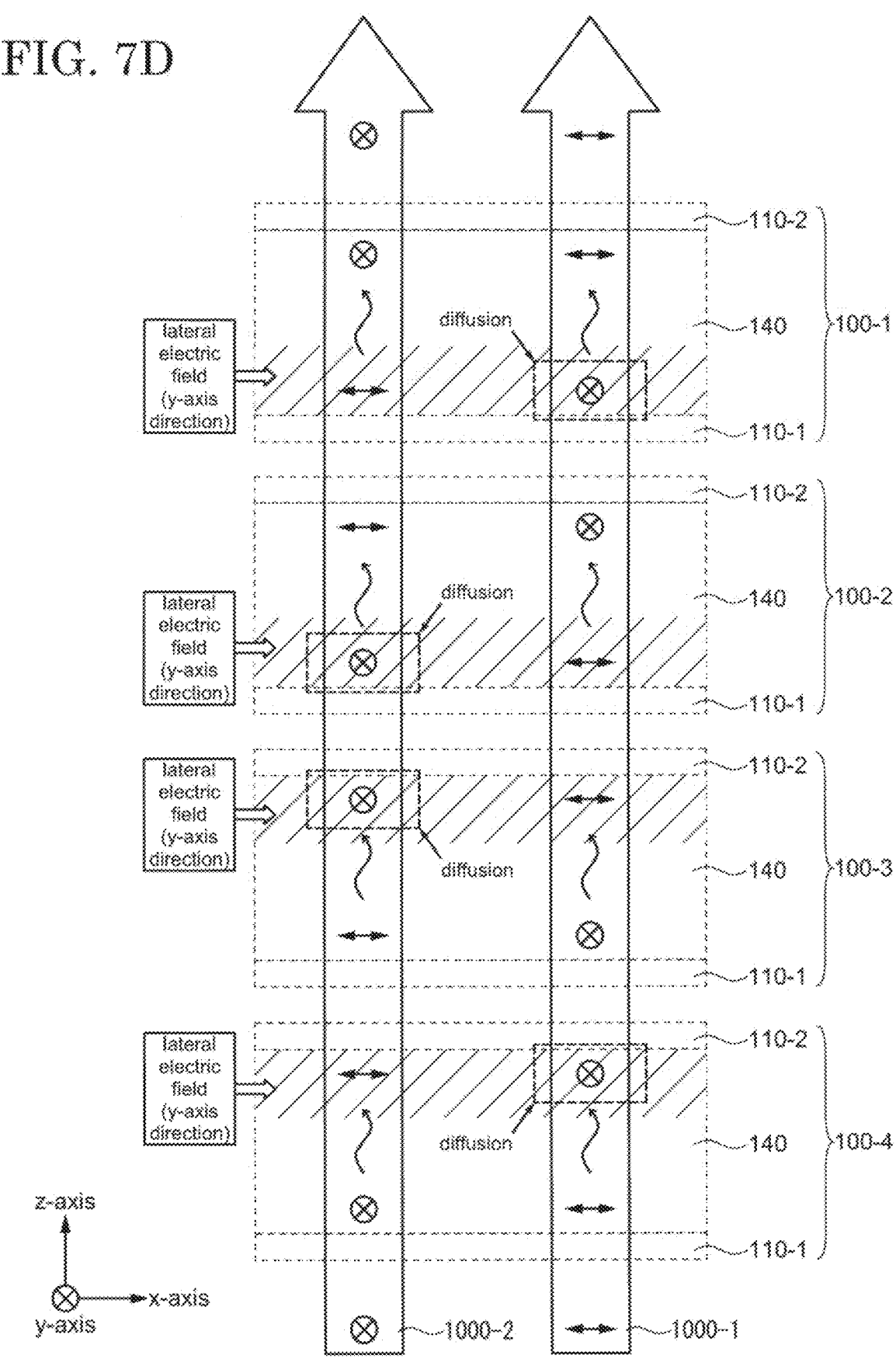
FIG. 7D is a schematic diagram illustrating a light distribution control of an optical element according to an embodiment of the present invention (First Embodiment).
Figure 7E:
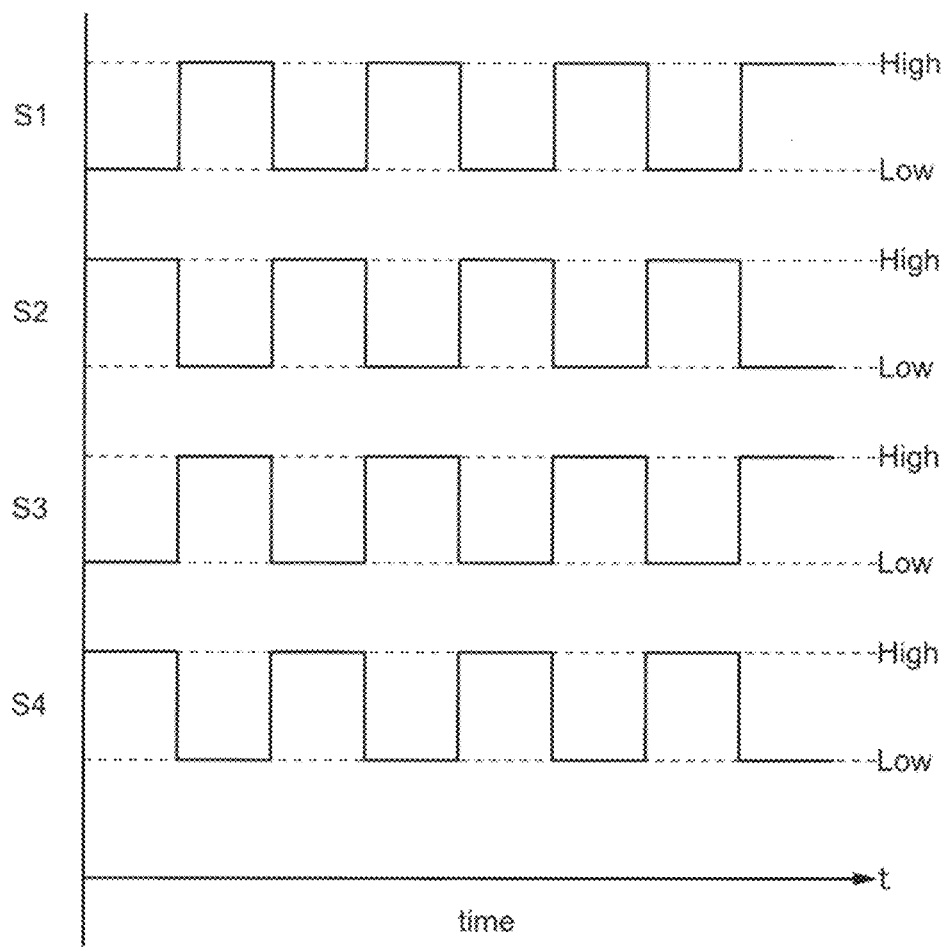
FIG. 7E is a timing chart showing signals input to inter-cell conductive members of an optical element according to an embodiment of the present invention (First Embodiment).

FIGS. 7A, 7C, and 7E are timing charts showing signals input to the inter-cell conductive members 170 of the optical element 10 according to an embodiment of the present invention. In FIGS. 7A, 7C, and 7E, a first signal S1, a second signal S2, a third signal S3, and a fourth signal S4 respectively indicate signals input to the first inter-cell conductive member 170-1, the second inter-cell conductive member 170-2, the third inter-cell conductive member 170-3, and the fourth inter-cell conductive member 170-4. In addition, hereinafter, although an intermediate potential between the high potential and the low potential is described as 0 V for convenience, the intermediate potential is not limited to 0 V. For example, when the high potential and the low potential are 30 V and 0 V, respectively, the intermediate potential may be 15 V.

Figure 7F:
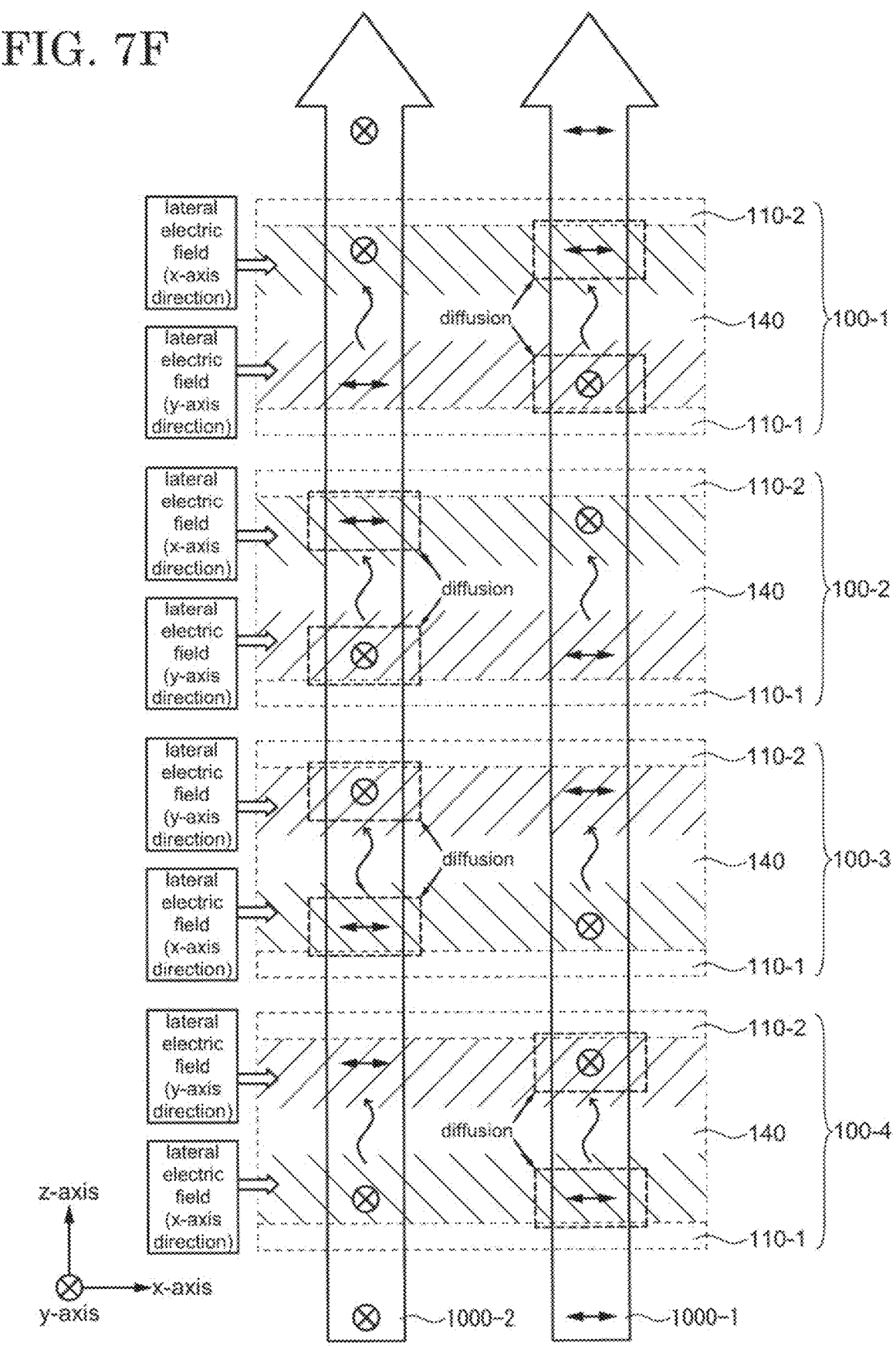
FIG. 7F is a schematic diagram illustrating a light distribution control of an optical element according to an embodiment of the present invention (First Embodiment).

FIGS. 7B, 7D, and 7F are schematic diagrams illustrating a light distribution control of the optical element 10 according to an embodiment of the present invention. Specifically, FIGS. 7B, 7D, and 7F show the light distribution control of the optical element 10 in the cases of FIGS. 7A, 7C, and 7E, respectively.

[5-1. Light Distribution with Linear Shape in X-axis Direction]

In FIG. 7A, each of the third signal S3 and the fourth signal S4 has an AC rectangular wave in which the high potential and the low potential are alternately repeated. However, the third signal S3 and the fourth signal S4 have inverted phases. Further, each of the first signal S1 and the second signal S2 is 0V. In this case, lateral electric fields are generated between the third transparent electrode 120-3 and the fourth transparent electrode 120-4 extending in the y-axis direction of each of the first liquid crystal cell 100-1 and the second liquid crystal cell 100-2, and between the first transparent electrode 120-1 and the second transparent electrode 120-2 extending in the y-axis direction of each of the third liquid crystal cell 100-3 and the fourth liquid crystal cell 100-4. In other words, as shown in FIG. 7B, the lateral electric field in the x-axis direction is generated on the side of the second substrate 110-2 of each of the first liquid crystal cell 100-1 and the second liquid crystal cell 100-2, and on the side of the first substrate 110-1 of each of the third liquid crystal cell 100-3 and the fourth liquid crystal cell 100-4. Therefore, as shown in FIG. 7B, the first polarized light 1000-1 having the P-polarization component and the second polarized light 1000-2 having the S-polarization component emitted from the light source 300 located below the fourth liquid crystal cell 100-4 undergo optical rotation by each liquid crystal cell 100 to change the polarization component, and the light is diffused in the x-axis direction by the liquid crystal molecules aligned by the lateral electric field in the x-axis direction when the light has the P-polarization component. That is, the light emitted from the light source 300 is controlled to be always diffused in the x-axis direction. Therefore, the light distribution can be controlled to have a linear shape in the x-axis direction according to the optical element 10 driven by the timing chart shown in FIG. 7A. In addition, the diffusion width in the x-axis direction (the light distribution angle in the x-axis direction) can be controlled by adjusting the potential difference between the high potential and the low potential. For example, when the potential difference increases, the diffusion width in the x-axis direction increases.

[5-2. Light Distribution with Linear Shape in Y-axis Direction]

In FIG. 7C, each of the third signal S3 and the fourth signal S4 is 0V. Further, each of the first signal S1 and the second signal S2 has an AC rectangular wave in which the high potential and the low potential are alternately repeated. However, the first signal S1 and the second signal S2 are inverted in phase. In this case, lateral electric fields are generated between the first transparent electrode 120-1 and the second transparent electrode 120-2 extending in the x-axis direction of each of the first liquid crystal cell 100-1 and the second liquid crystal cell 100-2, and between the third transparent electrode 120-3 and the fourth transparent electrode 120-4 extending in the x-axis direction of each of the third liquid crystal cell 100-3 and the fourth liquid crystal cell 100-4. In other words, as shown in FIG. 7D, the lateral electric field in the y-axis direction is generated on the side of the first substrate 110-1 of each of the first liquid crystal cell 100-1 and the second liquid crystal cell 100-2, and on the side of the second substrate 110-2 of each of the third liquid crystal cell 100-3 and the fourth liquid crystal cell 100-4. Therefore, as shown in FIG. 7D, the first polarized light 1000-1 having the P-polarization component and the second polarized light 1000-2 having the S-polarization component emitted from the light source 300 located below the fourth liquid crystal cell 100-4 undergo optical rotation by each liquid crystal cell 100 to change the polarization component, and the light is diffused in the y-axis direction by the liquid crystal molecules aligned by the lateral electric field in the y-axis direction when the light has the S-polarization component. That is, the light emitted from the light source 300 is controlled to be always diffused in the y-axis direction. Therefore, the light distribution can be controlled to have a linear shape in the y-axis direction according to the optical element 10 driven by the timing chart shown in FIG. 7C. In addition, the diffusion width in the y-axis direction (the light distribution angle in the y-axis direction) can be controlled by adjusting the potential difference between the high potential and the low potential. For example, when the potential difference increases, the diffusion width in the y-axis direction increases.

[5-3. Light Distribution with Circular Shape]

In FIG. 7E, each of the first signal S1, the second signal S2, the third signal S3, and the fourth signal S4 has an AC rectangular wave in which the high potential and the low potential are alternately repeated. However, the first signal S1 and the second signal S2 have inverted phases, and the third signal S3 and the fourth signal S4 have inverted phases. Further, the first signal S1 and the third signal S3 have the same phase, and the second signal S2 and the fourth signal S4 have the same phase. In this case, lateral electric fields are generated between the first transparent electrode 120-1 and the second transparent electrode 120-2 extending in the y-axis direction of each of the first liquid crystal cell 100-1 and the second liquid crystal cell 100-2, and between the third transparent electrode 120-3 and the fourth transparent electrode 120-4 extending in the x-axis direction. Further, lateral electric fields are generated between the first transparent electrode 120-1 and the second transparent electrode 120-2 extending in the y-axis direction of each of the third liquid crystal cell 100-3 and the fourth liquid crystal cell 100-4, and between the third transparent electrode 120-3 and the fourth transparent electrode 120-4 extending in the x-axis direction. In other words, as shown in FIG. 7F, the lateral electric field in the x-axis direction is generated on the side of the second substrate 110-2 of the first liquid crystal cell 100-1 and the second liquid crystal cell 100-2, and on the side of the first substrate 110-1 of each of the third liquid crystal cell 100-3 and the fourth liquid crystal cell 100-4. Further, the lateral electric field in the y-axis direction is generated on the side of the first substrate 110-1 of each of the first liquid crystal cell 100-1 and the second liquid crystal cell 100-2, and on the side of the second substrate 110-2 of each of the third liquid crystal cell 100-3 and the fourth liquid crystal cell 100-4. Therefore, as shown in FIG. 7F, the first polarized light 1000-1 having the P-polarization component and the second polarized light 1000-2 having the S-polarization component emitted from the light source 300 located below the fourth liquid crystal cell 100-4 undergo optical rotation in each liquid crystal cell 100 to change the polarization component. The first polarized light 1000-1 is diffused in the x-axis direction and the y-axis direction by the liquid crystal molecules aligned by the lateral electric fields in the x-axis direction and the y-axis direction in the first liquid crystal cell 100-1 and the fourth liquid crystal cell 100-4. The second polarized light 1000-2 is diffused in the x-axis direction and the y-axis direction by the liquid crystal molecules aligned by the lateral electric fields in the x-axis direction and the y-axis direction in the second liquid crystal cell 100-2 and the third liquid crystal cell 100-3. That is, the light emitted from the light source 300 is controlled to be uniformly diffused in the x-axis direction and the y-axis direction. Therefore, the light distribution can be controlled to have a circular shape according to the optical element 10 driven by the timing chart shown in FIG. 7E. The size of the circle (the light distribution angle in the x-axis direction and the y-axis direction) can be controlled by adjusting the potential difference between the high potential and the low potential. For example, when the potential difference increases, the size of the circle becomes larger. Further, when the potential difference between the high potential and the low potential in the first signal S1 and the second signal S2 is different from the potential difference between the high potential and the low potential in the third signal S3 and the fourth signal S4, the light distribution can also be controlled to have an elliptical shape.

As described above, in the optical element 10, the first liquid crystal cell 100-1 and the second liquid crystal cell 100-2 each have the electrode pattern A and the electrode pattern B, and the third liquid crystal cell 100-3 and the fourth liquid crystal cell 100-4 each have the electrode pattern C and the electrode pattern D. The transparent electrodes 120 of the plurality of liquid crystal cells 100 are electrically connected to the inter-cell conductive member 170, and a potential corresponding to a signal input through the inter-cell conductive member 170 is simultaneously applied to the plurality of transparent electrodes 120. In other words, the optical element 10 has a simple electrical connection with a small number of wirings, and can simultaneously drive the plurality of liquid crystal cells 100 so as to distribute the shape of transmitted light into any shape.

Second Embodiment

An optical element 20 according to an embodiment of the present invention is described with reference to FIGS. 8 to 10C. In the following description, when a configuration of the optical element 20 is similar to the configuration of the optical element 10, the description of the configuration of the optical element 20 may be omitted.

[1. Configuration of Optical Element 20]

Figure 8:
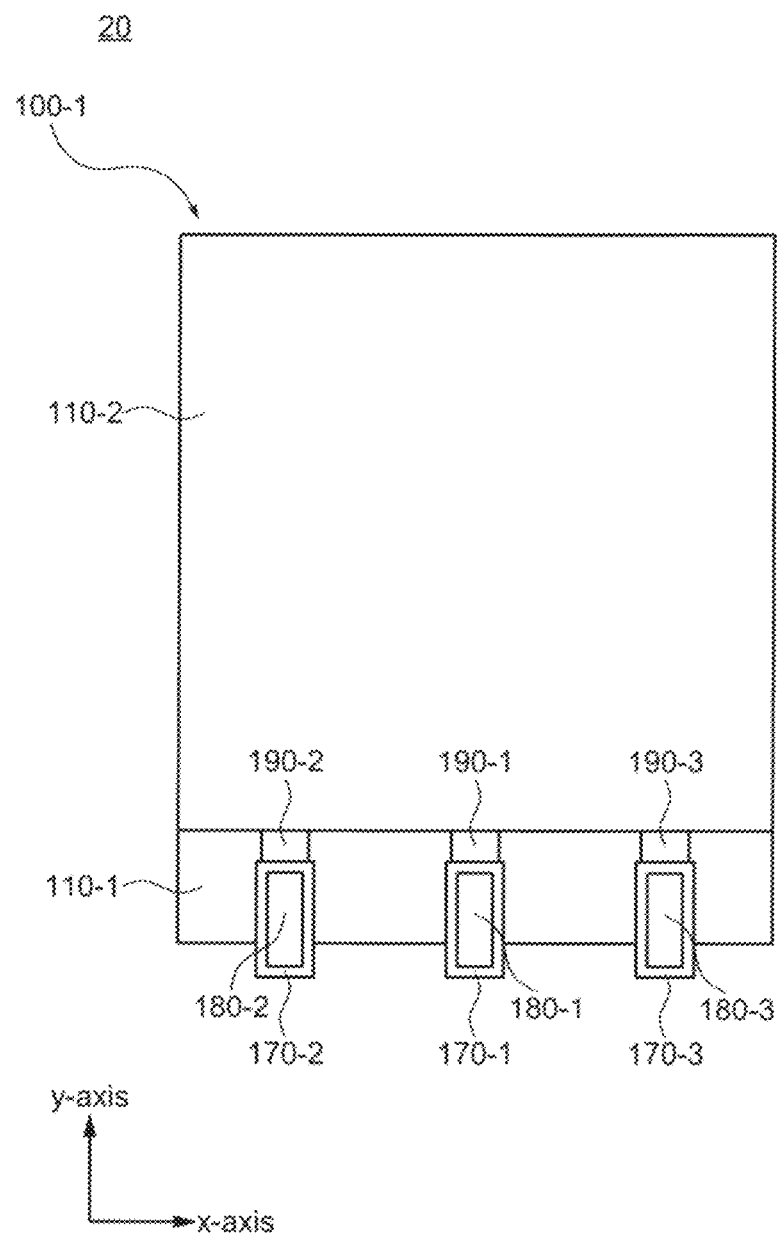
FIG. 8 is a schematic top view of an optical element according to an embodiment of the present invention (Second Embodiment).

FIG. 8 is a schematic top view of the optical element 20 according to an embodiment of the present invention. Although the first pad 190-1, the second pad 190-2, and the third pad 190-3 are provided on the first substrate 110-1 of the first liquid crystal cell 100-1 as shown in FIG. 8, the fourth pad 190-4 is not provided. That is, three pads 190 are provided on the first substrate 110-1 of each of four liquid crystal cells 100 of the optical element 20. Further, the first pad 190-1 of each of the four liquid crystal cells 100 are electrically connected via the first inter-cell conductive member 170-1 extending in the z-axis direction. Similarly, the second pads 190-2 are electrically connected via the second inter-cell conductive member 170-2 extending in the z-axis direction, and the third pads 190-3 are electrically connected via the third inter-cell conductive member 170-3 extending in the z-axis direction.

[2. Electrode Pattern of Liquid Crystal Cell 100]

Figure 9A:
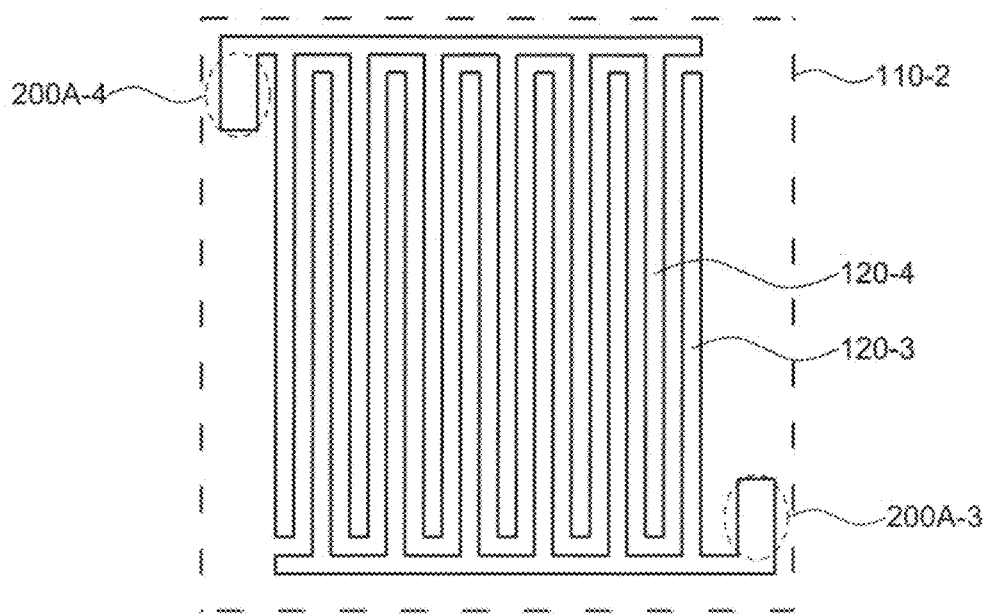
FIG. 9A is a schematic diagram illustrating electrode patterns of a liquid crystal cell of an optical element according to an embodiment of the present invention (Second Embodiment).
Figure 9A:
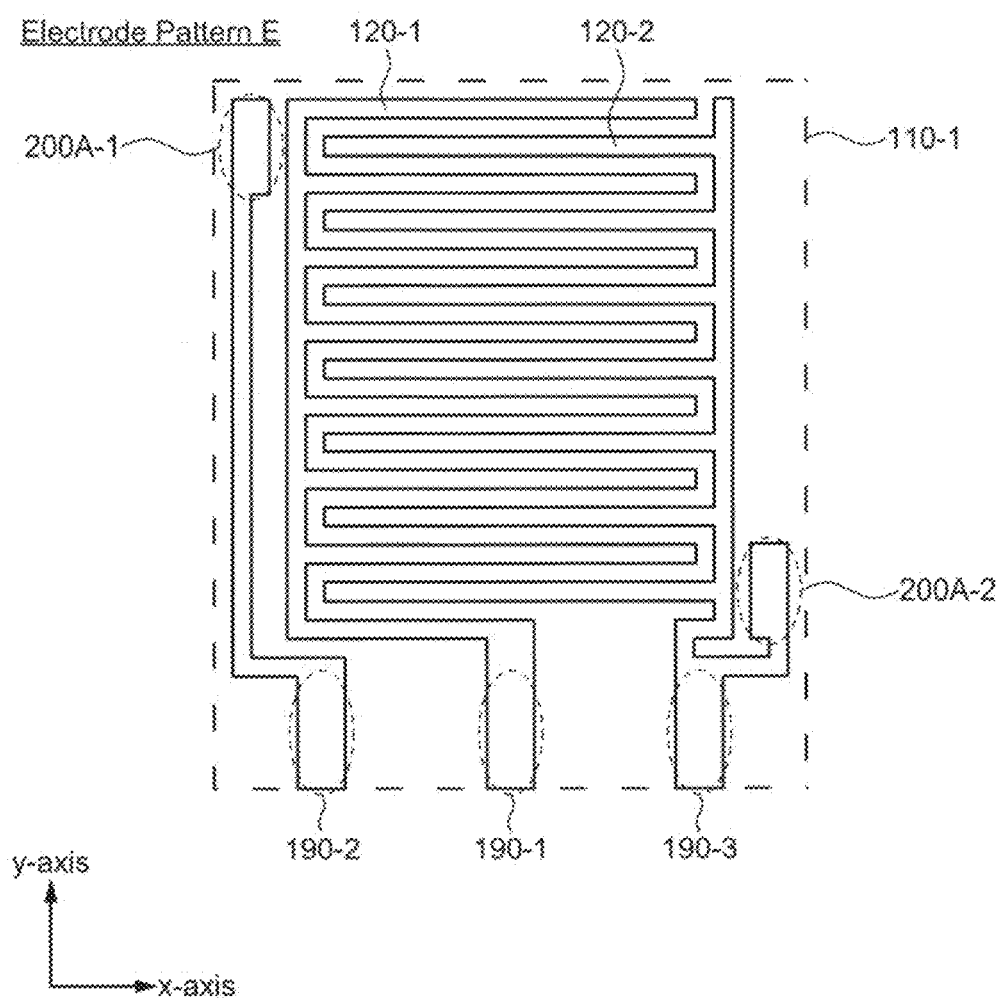
Figure 9B:
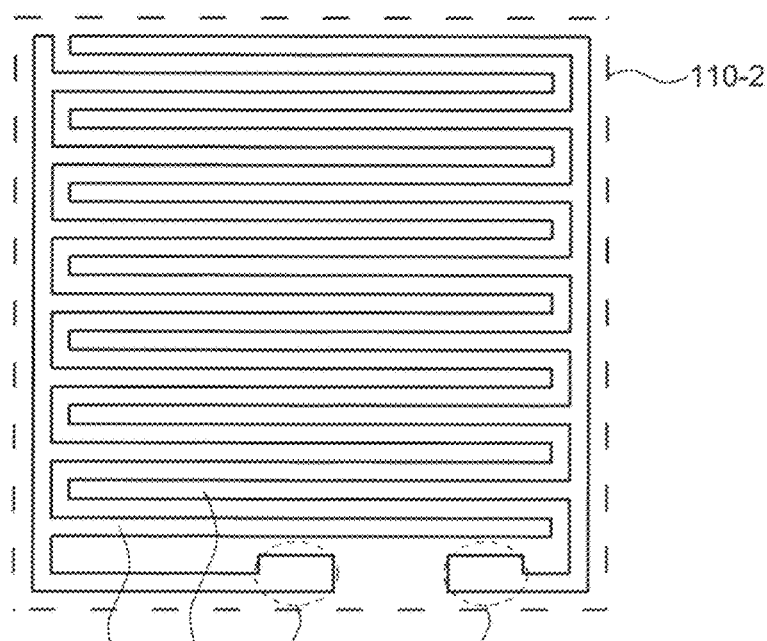
FIG. 9B is a schematic diagram illustrating electrode patterns of a liquid crystal cell of an optical element according to an embodiment of the present invention (Second Embodiment).
Figure 9B:
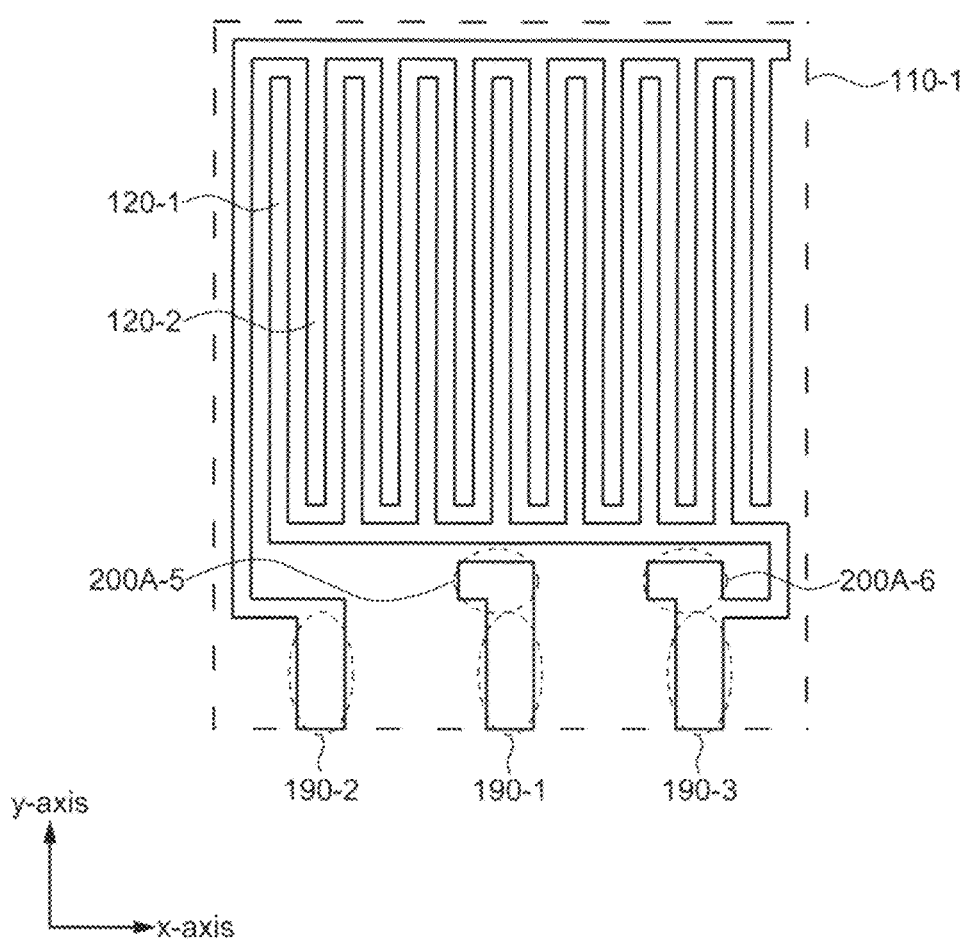

FIGS. 9A and 9B are schematic diagrams illustrating electrode patterns of the liquid crystal cell 100 of the optical element 20 according to an embodiment of the present invention. Specifically, FIG. 9A shows a schematic diagram showing an electrode pattern E on the first substrate 110-1 and an electrode pattern F on the second substrate 110-2 in each of the first liquid crystal cell 100-1 and the second liquid crystal cell 100-2, and FIG. 9B is a schematic diagram showing an electrode pattern G on the first substrate 110-1 and an electrode pattern H on the second substrate 110-2 in each of the third liquid crystal cell 100-3 and the fourth liquid crystal cell 100-4.

The electrode pattern E has a pattern in which the plurality of first transparent electrodes 120-1 extending in the x-axis direction are electrically connected to a first pad 190-1 provided at the end portion of the first substrate 110-1. Further, the electrode pattern E has a pattern in which a first connection region 200A-1 provided in the periphery of the first substrate 110-1 is electrically connected to the second pad 190-2 provided at the end portion of the first substrate 110-1. Furthermore, the electrode pattern E has a pattern in which the plurality of second transparent electrodes 120-2 extending in the x-axis direction and a second connection region 200A-2 provided in the periphery of the first substrate 110-1 are electrically connected to a third pad 190-3 provided at the end portion of the first substrate 110-1. In addition, the first pad 190-1 is located between the second pad 190-2 and the third pad 190-3.

The electrode pattern F has a pattern in which the plurality of third transparent electrodes 120-3 and the plurality of fourth transparent electrodes 120-4 extending in the y-axis direction are electrically connected to a third connection region 200A-3 and a fourth connection region 200A-4, respectively, provided in the periphery of the second substrate 110-2. In addition, in the first liquid crystal cell 100-1 and the second liquid crystal cell 100-2, a third connection region 200A-3 overlaps the second connection region 200A-2 and is electrically connected to the second connection region 200A-2 via the conductive paste. Similarly, a fourth connection region 200A-4 overlaps the first connection region 200A-1 and is electrically connected to the first connection region 200A-1 via the conductive paste.

The electrode pattern G has a pattern in which a fifth connection region 200A-5 provided close to the end portion of the first substrate 110-1 is electrically connected to the first pad 190-1 provided at the end portion of the first substrate 110-1. Further, the electrode pattern G has a pattern in which the plurality of first transparent electrodes 120-1 extending in the y-axis direction are electrically connected to the second pad 190-2 provided at the end portion of the first substrate 110-1. Furthermore, the electrode pattern G has a pattern in which the plurality of second transparent electrodes 120-2 extending in the y-axis direction and a sixth connection region 200A-6 provided close to the end portion of the first substrate 110-1 are electrically connected to the third pad 190-3 provided at the end portion of the first substrate 110-1.

The electrode pattern H has a pattern in which the plurality of third transparent electrodes 120-3 and the plurality of fourth transparent electrodes 120-4 extending in the x-axis direction are electrically connected to a seventh connection region 200A-7 and an eighth connection region 200A-8, respectively, provided in the periphery of the second substrate 110-2. In addition, in the third liquid crystal cell 100-3 and the fourth liquid crystal cell 100-4, the seventh connection region 200A-7 overlaps the fifth connection region 200A-5 and is electrically connected to the fifth connection region 200A-5 via the conductive paste. Similarly, the eighth connection region 200A-8 overlaps the sixth connection region 200A-6 and is electrically connected to the sixth connection region 200A-6 via the conductive paste.

Therefore, in each of the first liquid crystal cell 100-1 and the second liquid crystal cell 100-2, the first transparent electrode 120-1 is electrically connected to the first pad 190-1, the second transparent electrode 120-2 and the third transparent electrode 120-3 are electrically connected to the third pad 190-3, and the fourth transparent electrode 120-4 is electrically connected to the second pad 190-2. On the other hand, in each of the third liquid crystal cell 100-3 and the fourth liquid crystal cell 100-4, the first transparent electrode 120-1 and the fourth transparent electrode 120-4 are electrically connected to the third pad 190-3, the second transparent electrode 120-2 is electrically connected to the second pad 190-2, and the third transparent electrode 120-3 is electrically connected to the first pad 190-1.

The pads 190 of the four liquid crystal cells 100 are electrically connected to each other via the inter-cell conductive member 170. Therefore, in the optical element 20, a potential corresponding to a signal can be simultaneously applied to the first transparent electrode 120-1 of each of the first liquid crystal cell 100-1 and the second liquid crystal cell 100-2 and the third transparent electrode 120-3 of each of the third liquid crystal cell 100-3 and the fourth liquid crystal cell 100-4 by inputting the signal through the first inter-cell conductive member 170-1. Further, a potential corresponding to a signal can be simultaneously applied to the fourth transparent electrode 120-4 of each of the first liquid crystal cell 100-1 and the second liquid crystal cell 100-2 and the second transparent electrode 120-2 of each of the third liquid crystal cell 100-3 and the fourth liquid crystal cell 100-4 by inputting the signal through the second inter-cell conductive member 170-2. Furthermore, a potential corresponding to a signal can be simultaneously applied to the second transparent electrode 120-2 and the third transparent electrode 120-3 of each of the first liquid crystal cell 100-1 and the second liquid crystal cell 100-2, and the first transparent electrode 120-1 and the fourth transparent electrode 120-4 of each of the third liquid crystal cell 100-3 and the fourth liquid crystal cell 100-4 by inputting the signal through the third inter-cell conductive member 170-3.

As described above, in the optical element 20, a potential corresponding to a signal can be simultaneously applied to the transparent electrodes 120 of the plurality of liquid crystal cells 100 by inputting the signal through each of the three inter-cell conductive members 170. Therefore, in the optical element 20, it is sufficient that one FPC is connected to the pad portion 180 provided on the upper end of the inter-cell conductive member 170, and the electrical connection in the mounting process can be simplified.

[3. Light Distribution Control of Optical Element 20]

Figure 10A:
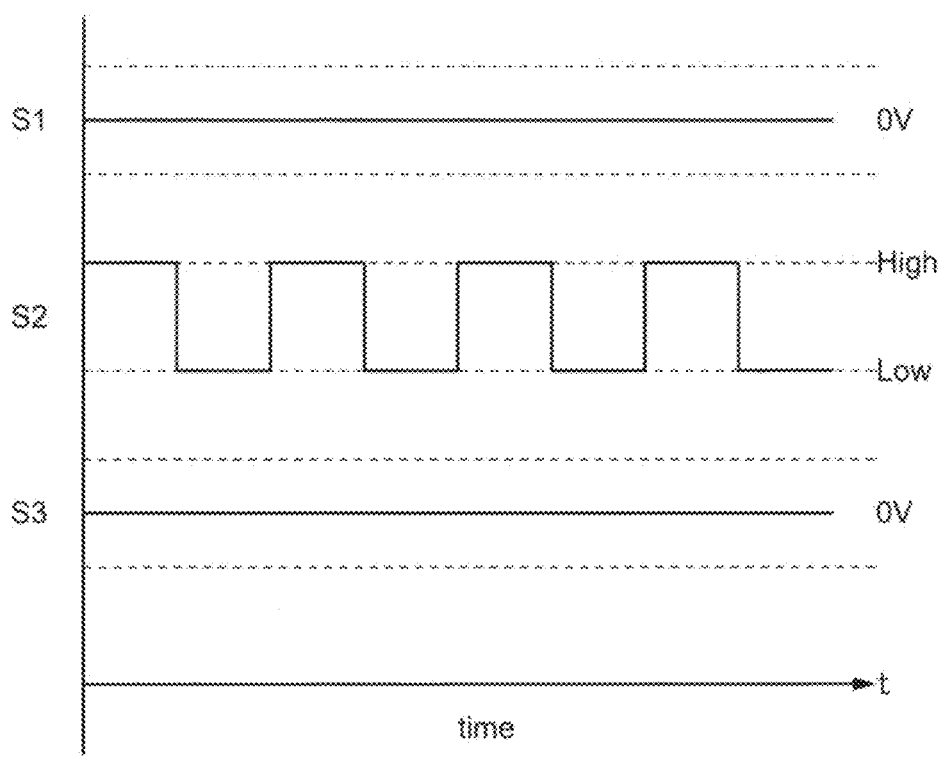
FIG. 10A is a timing chart showing signals input to inter-cell conductive members of an optical element according to an embodiment of the present invention (Second Embodiment).
Figure 10B:
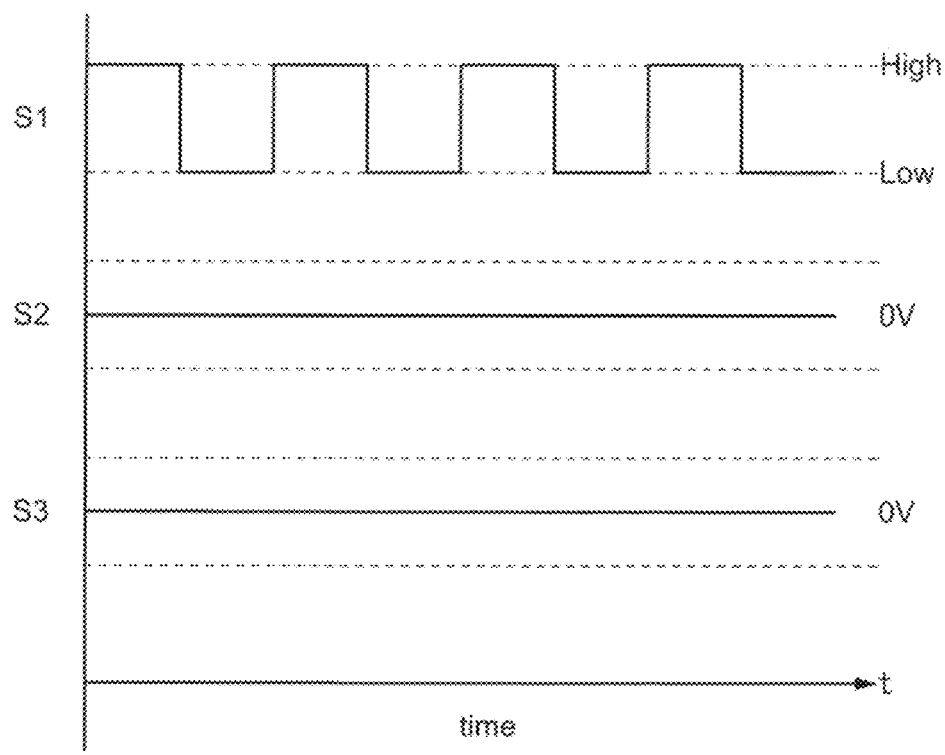
FIG. 10B is a timing chart showing signals input to inter-cell conductive members of an optical element according to an embodiment of the present invention (Second Embodiment).
Figure 10C:
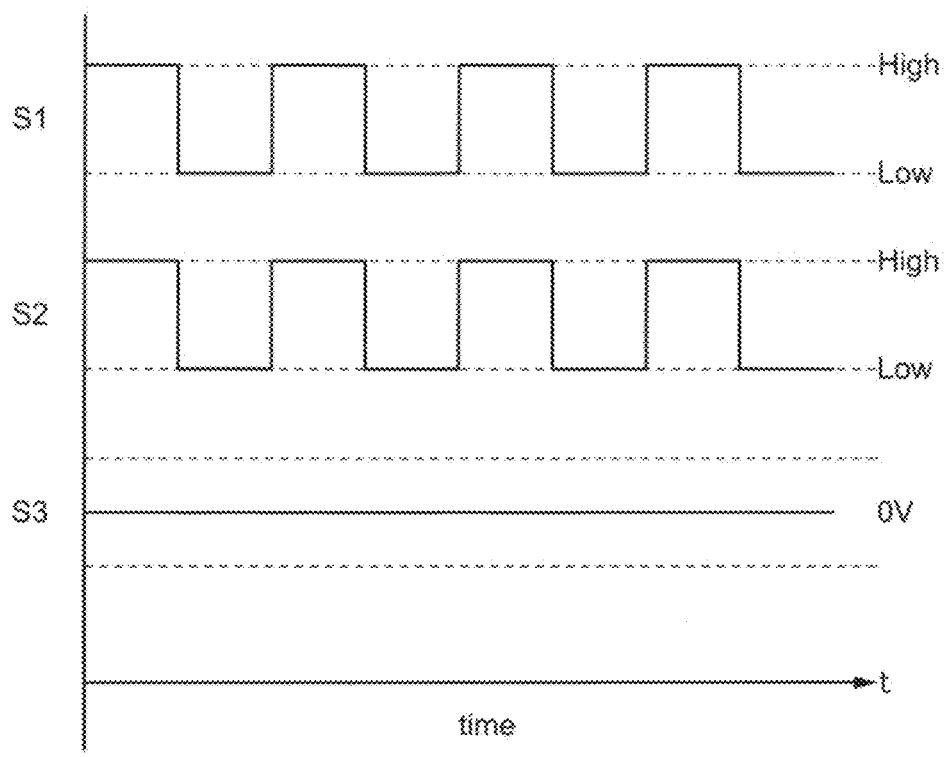
FIG. 10C is a timing chart showing signals input to inter-cell conductive members of an optical element according to an embodiment of the present invention (Second Embodiment).

FIGS. 10A to 10C are timing charts showing signals input to the inter-cell conductive members 170 of the optical element 20 according to an embodiment of the present invention. A first signal S1, a second signal S2, and a third signal S3 in FIGS. 10A to 10C show signals input to the first inter-cell conductive member 170-1, the second inter-cell conductive member 170-2, and the third inter-cell conductive member 170-3, respectively.

[3-1. Light Distribution with Linear Shape in X-axis Direction]

In FIG. 10A, the second signal S2 has an AC rectangular wave in which the high potential and the low potential are alternately repeated. Further, each of the first signal S1 and the third signal S3 is 0 V. In this case, lateral electric fields are generated between the third transparent electrode 120-3 and the fourth transparent electrode 120-4 extending in the y-axis direction of each of the first liquid crystal cell 100-1 and the second liquid crystal cell, and between the first transparent electrode 120-1 and the second transparent electrode 120-2 extending in the y-axis direction of each of the third liquid crystal cell 100-3 and the fourth liquid crystal cell 100-4. In other words, as shown in FIG. 7B, the lateral electric field in the x-axis direction is generated on the side of the second substrate 110-2 of each of the first liquid crystal cell 100-1 and the second liquid crystal cell 100-2, and on the side of the first substrate 110-1 of each of the third liquid crystal cell 100-3 and the fourth liquid crystal cell 100-4. Therefore, as shown in FIG. 7B, each of the first polarized light 1000-1 having the P-polarization component and the second polarized light 1000-2 having the S-polarization component emitted from the light source 300 located below the fourth liquid crystal cell 100-4 is diffused in the x-axis direction by the liquid crystal molecules aligned by the lateral electric field in the x-axis direction. That is, the light emitted from the light source 300 is controlled to be diffused in the x-axis direction. Therefore, the light distribution can be controlled to have a linear shape in the x-axis direction according to the optical element 20 driven by the timing chart shown in FIG. 10A.

[3-2. Light Distribution with Linear Shape in Y-axis Direction]

In FIG. 10B, the first signal S1 has an AC rectangular wave in which the high potential and the low potential are alternately repeated. Further, each of the second signal S2 and the third signal S3 is 0 V. In this case, lateral electric fields are generated between the first transparent electrode 120-1 and the second transparent electrode 120-2 extending in the x-axis direction of each of the first liquid crystal cell 100-1 and the second liquid crystal cell 100-2, and between the third transparent electrode 120-3 and the fourth transparent electrode 120-4 extending in the x-axis direction of each of the third liquid crystal cell 100-3 and the fourth liquid crystal cell 100-4. In other words, as shown in FIG. 7D, the lateral electric field in the y-axis direction is generated on the side of the first substrate 110-1 of each of the first liquid crystal cell 100-1 and the second liquid crystal cell 100-2, and on the side of the second substrate 110-2 of each of the third liquid crystal cell 100-3 and the fourth liquid crystal cell 100-4. Therefore, as shown in FIG. 7D, each of the first polarized light 1000-1 having the P-polarization component and the second polarized light 1000-2 having the S-polarization component emitted from the light source 300 located below the fourth liquid crystal cell 100-4 is diffused in the y-axis direction by the liquid crystal molecules aligned by the lateral electric field in the y-axis direction. That is, the light emitted from the light source 300 is controlled to be diffused in the y-axis direction. Therefore, the light distribution can be controlled to have a linear shape in the y-axis direction according to the optical element 20 driven by the timing chart shown in FIG. 10B.

[3-3. Light Distribution with Circular Shape]

In FIG. 10C, each of the first signal S1 and the second signal S2 has an AC rectangular wave in which the high potential and the low potential are alternately repeated. The first signal S1 and the second signal S2 have the same phase. The third signal S3 is 0 V. In this case, lateral electric fields are generated between the first transparent electrode 120-1 and the second transparent electrode 120-2 extending in the y-axis direction of each of the first liquid crystal cell 100-1 and the second liquid crystal cell 100-2, and between the third transparent electrode 120-3 and the fourth transparent electrode 120-4 extending in the x-axis direction. Further, lateral electric fields are generated between the first transparent electrode 120-1 and the second transparent electrode 120-2 extending in the y-axis direction of each of the third liquid crystal cell 100-3 and the fourth liquid crystal cell 100-4, and between the third transparent electrode 120-3 and the fourth transparent electrode 120-4 extending in the x-axis direction. In other words, as shown in FIG. 7F, the lateral electric field in the x-axis direction is generated on the side of the second substrate 110-2 of the first liquid crystal cell 100-1 and the second liquid crystal cell 100-2, and on the side of the first substrate 110-1 of each of the third liquid crystal cell 100-3 and the fourth liquid crystal cell 100-4. Further, the lateral electric field in the y-axis direction is generated on the side of the first substrate 110-1 of each of the first liquid crystal cell 100-1 and the second liquid crystal cell 100-2, and on the side of the second substrate 110-2 of each of the third liquid crystal cell 100-3 and the fourth liquid crystal cell 100-4. Therefore, as shown in FIG. 7F, the first polarized light 1000-1 having the P-polarization component emitted from the light source 300 located below the fourth liquid crystal cell 100-4 is diffused in the x-axis direction and the y-axis direction by the liquid crystal molecules aligned by the lateral electric fields in the x-axis direction and the y-axis direction in the first liquid crystal cell 100-1 and the fourth liquid crystal cell 100-4. Further, the second polarized light 1000-2 is diffused in the x-axis direction and the y-axis direction by the liquid crystal molecules aligned by the lateral electric fields in the x-axis direction and the y-axis direction in the second liquid crystal cell 100-2 and the third liquid crystal cell 100-3. That is, the light emitted from the light source 300 is controlled to be uniformly diffused in the x-axis direction and the y-axis direction. Therefore, the light distribution can be controlled to have a circular shape according to the optical element 20 driven by the timing chart shown in FIG. 10C.

In addition, the light distribution can be controlled to have an elliptical shape by making the amplitudes of the first signal S1 and the second signal S2 different from each other (making the potential difference different).

As described above, in the optical element 20, the first liquid crystal cell 100-1 and the second liquid crystal cell 100-2 each have the electrode pattern E and the electrode pattern F, and the third liquid crystal cell 100-3 and the fourth liquid crystal cell 100-4 each have the electrode pattern G and the electrode pattern H. The transparent electrodes 120 of the plurality of liquid crystal cells 100 are electrically connected to the inter-cell conductive member 170, and a potential corresponding to a signal input through the inter-cell conductive member 170 is simultaneously applied to the plurality of transparent electrodes 120. In other words, the optical element 20 has a simple electrical connection with a small number of wirings, and can simultaneously drive the plurality of liquid crystal cells 100 so as to distribute the shape of transmitted light into any shape.

Third Embodiment

An optical element 30 according to an embodiment of the present invention is described with reference to FIGS. 11 and 12. In the following description, when a configuration of the optical element 30 is similar to the configuration of the optical element 10, the description of the configuration of the optical element 30 may be omitted.

[1. Configuration of Optical Element 30]

Figure 11:
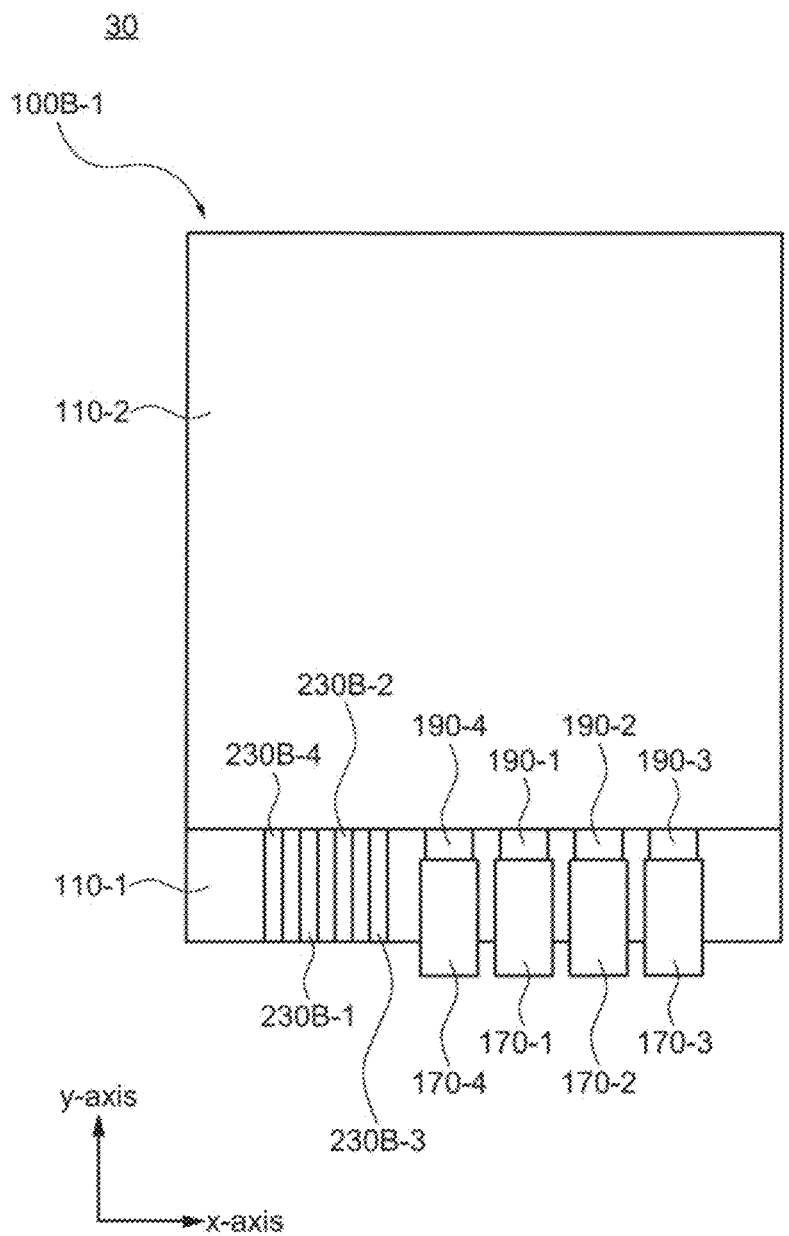
FIG. 11 is a schematic top view of an optical element according to an embodiment of the present invention (Third Embodiment).

FIG. 11 is a schematic top view of an optical element 30 according to an embodiment of the present invention. As shown in FIG. 11, the first pad 190-1, the second pad 190-2, the third pad 190-3, and the fourth pad 190-4 are provided on the first substrate 110-1 of a first liquid crystal cell 100B-1. Further, a first terminal 230B-1, a second terminal 230B-2, a third terminal 230B-3, and a fourth terminal 230B-4 are provided on the first substrate 110-1 of the first liquid crystal cell 100B-1. That is, in the optical element 30, the terminals 230B are provided directly on the first substrate 110-1 of the first liquid crystal cell 100B-1 without overlapping the inter-cell conductive members 170.

[2. Electrode Pattern of First Liquid Crystal Cell 100-1]

Figure 12:
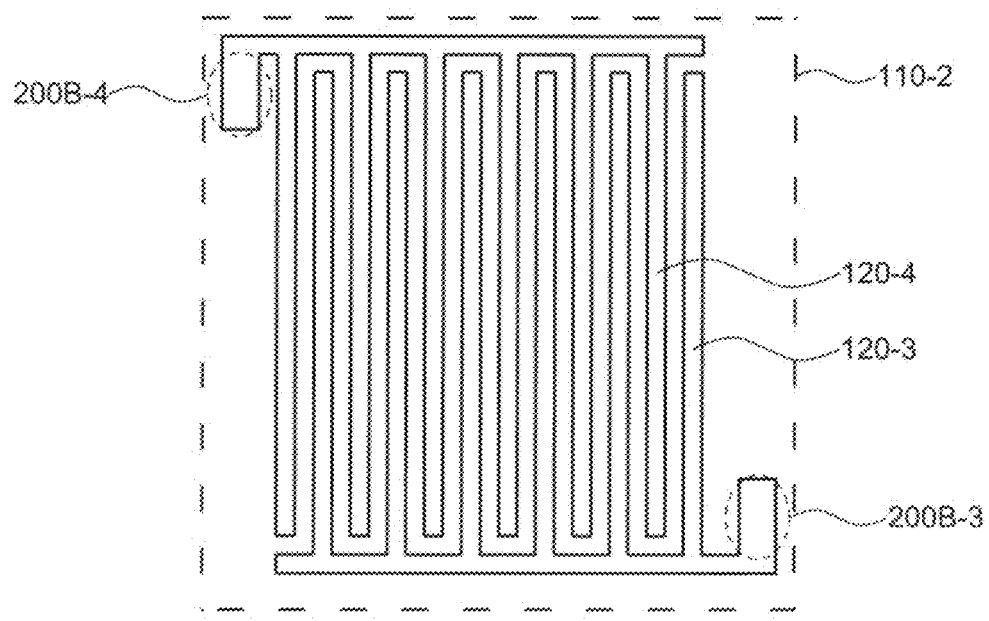
FIG. 12 is a schematic diagram illustrating electrode patterns of a liquid crystal cell of an optical element according to an embodiment of the present invention (Third Embodiment).
Figure 12:
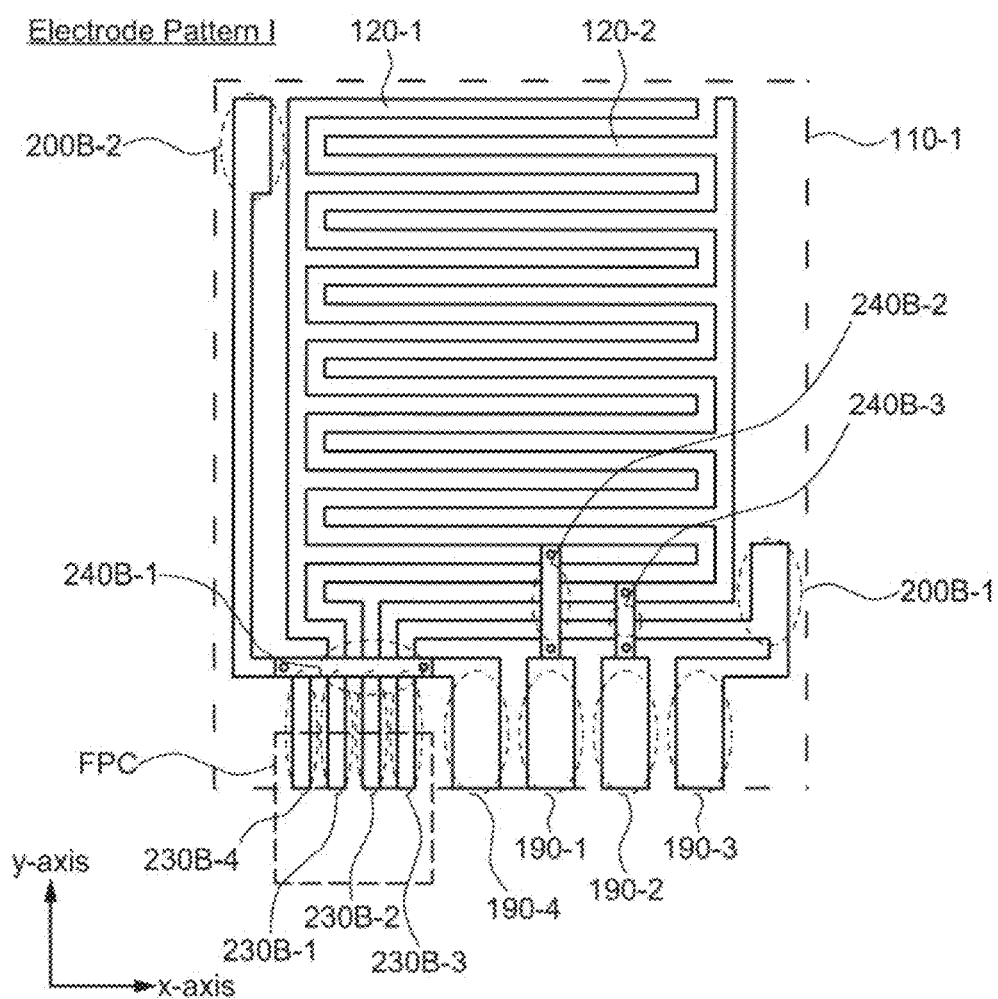

FIG. 12 is a schematic diagram illustrating electrode patterns of the first liquid crystal cell 100-1 of the optical element 30 according to an embodiment of the present invention. Specifically, FIG. 12 is a schematic diagram showing an electrode pattern I on the first substrate 110-1 and an electrode pattern J on the second substrate 110-2 in the first liquid crystal cell 100-1.

The electrode pattern I has a pattern in which the plurality of first transparent electrodes 120-1 and the plurality of second transparent electrodes 120-2 extending in the x-axis direction are electrically connected to the first pad 190-1 and the second pad 190-2, respectively, provided at the end portion of the first substrate 110-1. Further, the electrode pattern I has a pattern in which a first connection region 200B-1 and a second connection region 200B-2 provided in the periphery of the first substrate 110-1 are electrically connected to the third pad 190-3 and the fourth pad 190-4, respectively, provided at the end portion of the first substrate 110-1.

Further, a first terminal 230B-1, a second terminal 230B-2, a third terminal 230B-3, and a fourth terminal 230B-4 are electrically connected to the first pad 190-1, the second pad 190-2, the third pad 190-3, and the fourth pad 190-4, respectively. As shown in FIG. 12, the wiring connecting the fourth terminal 230B-4 and the fourth pad 190-4 is a bridge wiring. The bridge wiring crosses the wiring group extended from the first terminal 230B-1, the second terminal 230B-2, and the third terminal 230B-3 at a first intersection 240B-1 through an insulating layer. Further, the bridge wiring is connected to the wiring on the side of the fourth terminal 230B-4 and the wiring on the side of the fourth pad 190-4 through contact holes at both ends.

Furthermore, the wiring connecting the first terminal 230B-1 and the first pad 190-1 crosses the wirings connecting the second terminal 230B-2 and the third terminal 230B-3 and the second pad 190-2 and the third pad 190-3, respectively, at a second intersection 240B-2 through the insulating layer. Moreover, the wiring connecting the second terminal 230B-2 and the second pad 190-2 crosses the wiring connecting the third terminal 230B-3 and the third pad 190-3 at a third intersection 240B-3 through the insulating layer. The configurations of the second intersection 240B-2 and the third intersection 240B-3 are similar to the configuration of the first intersection 240B-1.

The electrode pattern J has a pattern in which the plurality of third transparent electrodes 120-3 and the plurality of fourth transparent electrodes 120-4 extending in the y-axis direction are electrically connected to a third connection region 200B-3 and a fourth connection region 200B-4, respectively, provided in the periphery of the second substrate 110-2.

In addition, the electrode pattern A and the electrode pattern B are provided on the first substrate 110-1 and the second substrate 110-2, respectively, of the second liquid crystal cell 100-2 (however, the position of the pads 190 is adjusted to match the first liquid crystal cell 100-1). Further, the electrode pattern C and the electrode pattern D are provided on the first substrate 110-1 and the second substrate 110-2, respectively, of each of the third liquid crystal cell 100-3 and the fourth liquid crystal cell 100-4 (however, the position of the pads 190 is adjusted to match the first liquid crystal cell 100-1).

Therefore, in each of the first liquid crystal cell 100-1 and the second liquid crystal cell 100-2, the first transparent electrode 120-1, the second transparent electrode 120-2, the third transparent electrode 120-3, and the fourth transparent electrode 120-4 are electrically connected to the first pad 190-1, the second pad 190-2, the third pad 190-3, and the fourth pad 190-4, respectively. On the other hand, in each of the third liquid crystal cell 100-3 and the fourth liquid crystal cell 100-4, the first transparent electrode 120-1, the second transparent electrode 120-2, the third transparent electrode 120-3, and the fourth transparent electrode 120-4 are electrically connected to the third pad 190-3, the fourth pad 190-4, the first pad 190-1, and the second pad 190-2, respectively.

In the optical element 30 according to this embodiment, the terminals 230B that are electrically connected to the FPC are provided in addition to the pads 190 that contact the inter-cell conductive members 170 (see FIG. 12). Therefore, the FPC can be easily connected to the optical element 30 regardless of the method for forming the inter-cell conductive member 170 or the shape of the inter-cell conductive member 170.

Fourth Embodiment

An optical element 40 according to an embodiment of the present invention is described with reference to FIGS. 13 and 14. In the following description, when a configuration of the optical element 40 is similar to the configuration of the optical element 10, the description of the configuration of the optical element 40 may be omitted.

[1. Configuration of Optical Element 40]

Figure 13:
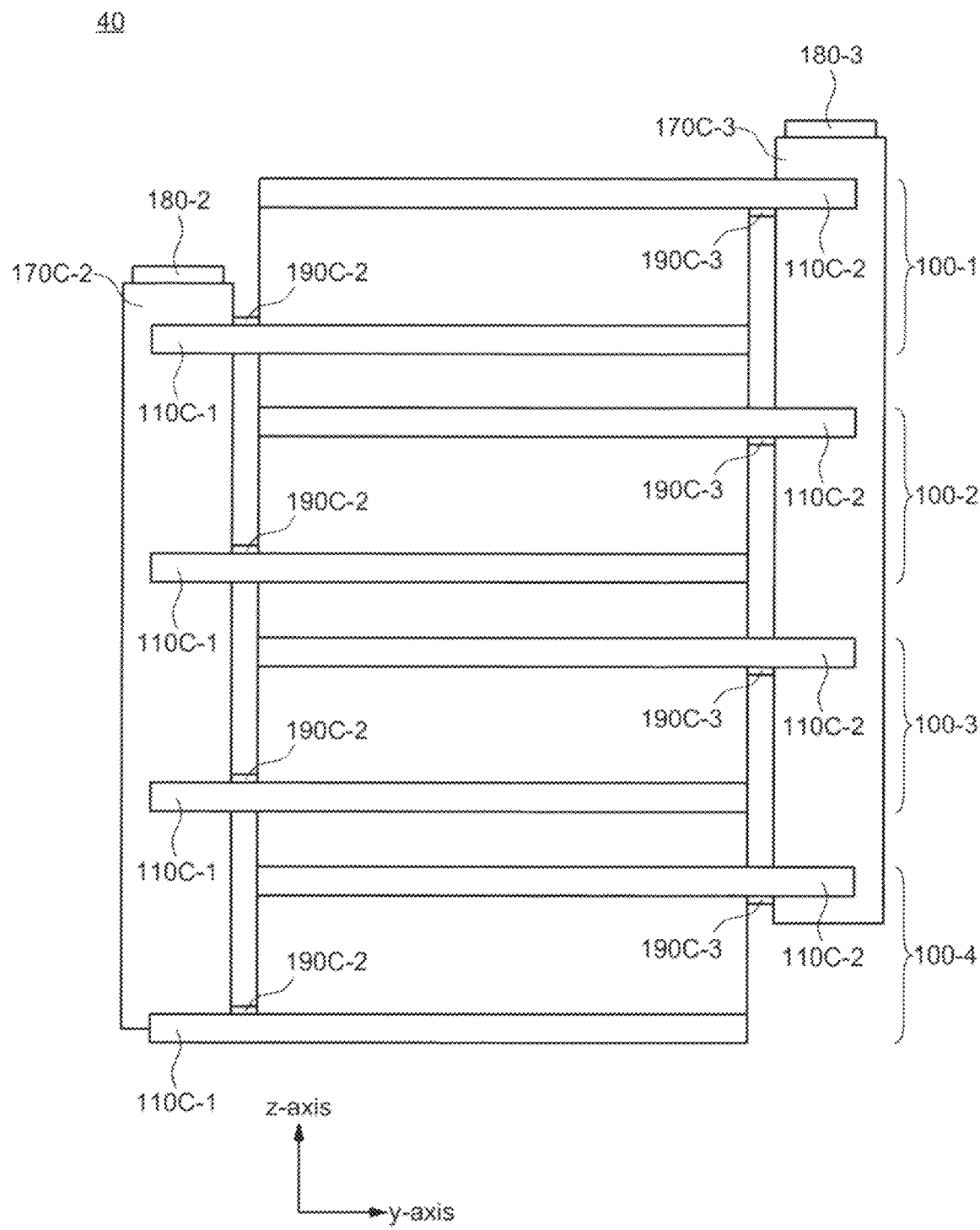
FIG. 13 is a schematic side view of an optical element according to an embodiment of the present invention (Fourth Embodiment).

FIG. 13 is a schematic side view of the optical element 40 according to an embodiment of the present invention. As shown in FIG. 13, each of the liquid crystal cells 100 of the optical element 40 has one side from which an end portion of the first substrate 110C-1 protrudes, and the other side located opposite to the side from which the second substrate 110C-2 protrudes. A first pad 190C-1 and a second pad 190C-2 are provided at the end portion of the first substrate 110C-1 (see FIG. 14 described later for the first pad 190C-1). Further, a third pad 190C-3 and a fourth pad 190C-4 are provided at the end portion of the second substrate 110C-2 (see FIG. 14 described later for the fourth pad 190C-4). The first pad 190C-1 and the second pad 190C-2 of the plurality of liquid crystal cells 100 are electrically connected to the first inter-cell conductive member 170C-1 and the second inter-cell conductive member 170C-2, respectively, on one side (the first inter-cell conductive member 170C-1 has the same configuration as the second inter-cell conductive member 170C-2). The third pad 190C-3 and the fourth pad 190C-4 of the plurality of liquid crystal cells 100 are electrically connected to the third inter-cell conductive member 170C-3 and the fourth inter-cell conductive member 170C-4, respectively, on the other side (the fourth inter-cell conductive member 170C-4 has the same configuration as the third inter-cell conductive member 170C-3).

[2. Electrode Pattern of Liquid Crystal Cell 100]

Figure 14:
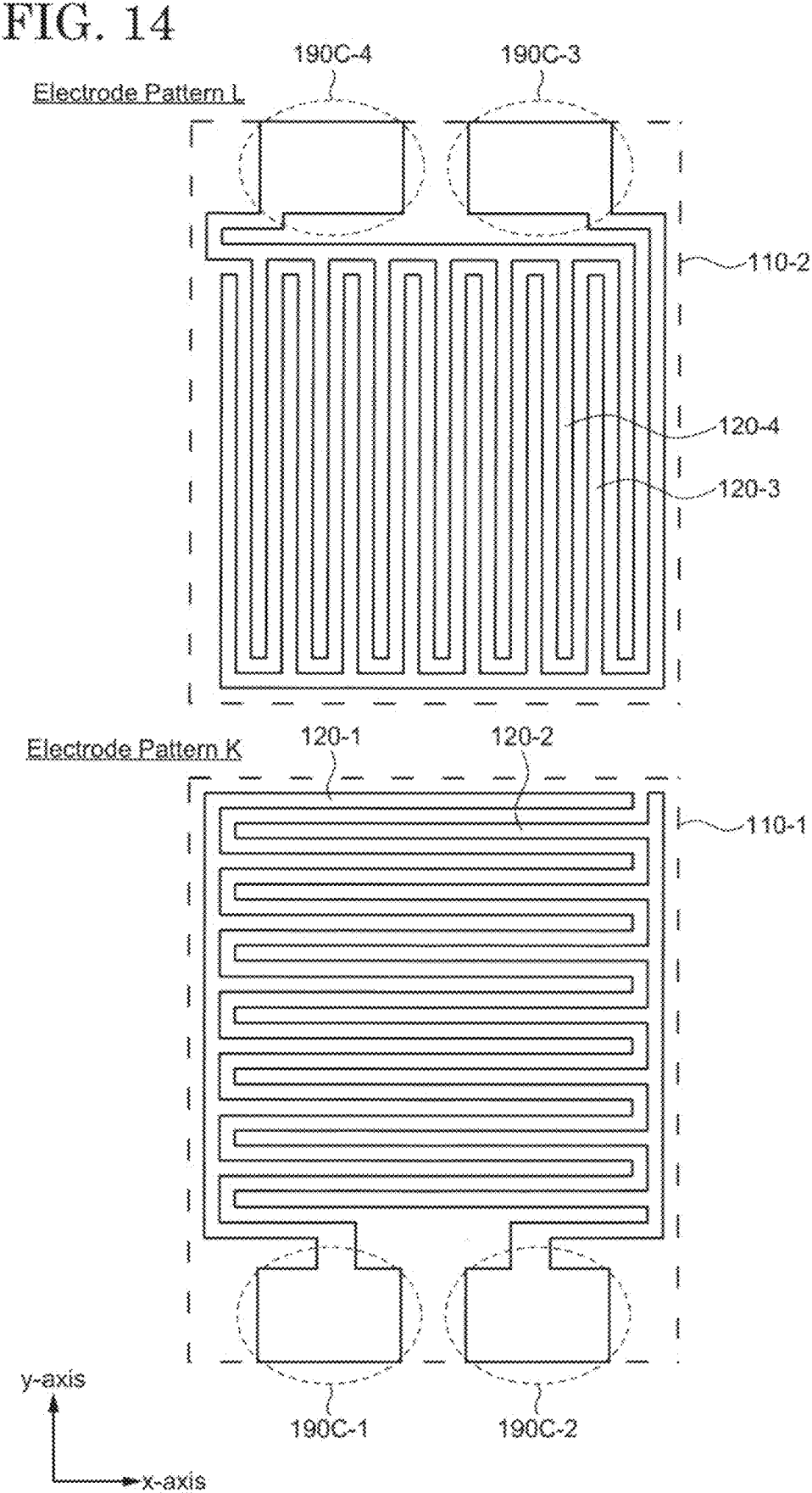
FIG. 14 is a schematic diagram illustrating electrode patterns of a liquid crystal cell of an optical element according to an embodiment of the present invention (Fourth Embodiment).

FIG. 14 is a schematic diagram illustrating electrode patterns of the liquid crystal cell 100 of the optical element 40 according to an embodiment of the present invention. Specifically, FIG. 14 is a schematic diagram showing an electrode pattern K on the first substrate 110-1 and an electrode pattern L on the second substrate 110-2 in four liquid crystal cells 100.

The electrode pattern K has a pattern in which the plurality of first transparent electrodes 120-1 and the plurality of second transparent electrodes 120-2 extending in the x-axis direction are electrically connected to a first pad 190C-1 and a second pad 190C-2, respectively, provided at the end portion of the first substrate 110-1.

The electrode pattern L has a pattern in which the plurality of third transparent electrodes 120-3 and the plurality of fourth transparent electrodes 120-4 extending in the y-axis direction are electrically connected to a third pad 190C-3 and a fourth pad 190C-4, respectively, provided at the end portion of the second substrate 110-2.

Therefore, the first transparent electrode 120-1, the second transparent electrode 120-2, the third transparent electrode 120-3, and the fourth transparent electrode 120-4 of each of the four liquid crystal cells 100 are electrically connected to the first pad 190C-1, the second pad 190C-2, the third pad 190C-3, and the fourth pad 190C-4, respectively. Further, the pads 190C of the four liquid crystal cells are electrically connected to each other via the inter-cell conductive member 170C. Therefore, in the optical element 40, a potential corresponding to a signal can be simultaneously applied to the first transparent electrode 120-1 of each of the four liquid crystal cells 100 by inputting the signal through the first inter-cell conductive member 170C-1. Further, a potential corresponding to a signal can be simultaneously applied to the second transparent electrode 120-2 of each of the four liquid crystal cells 100 by inputting the signal through the second inter-cell conductive member 170C-2. Furthermore, a potential corresponding to a signal can be simultaneously applied to the third transparent electrodes 120-3 of the four liquid crystal cells 100 by inputting the signal through the third inter-cell conductive member 170C-3. Moreover, a potential corresponding to a signal can be simultaneously applied to the fourth transparent electrodes 120-4 of the four liquid crystal cells 100 by inputting the signal through the fourth inter-cell conductive member 170C-4.

As described above, in the optical element 40, each of the four liquid crystal cells has the electrode pattern K and the electrode pattern L. The transparent electrodes 120 of the plurality of liquid crystal cells 100 are electrically connected to the inter-cell conductive member 170C, and a potential corresponding to a signal input through the inter-cell conductive member 170C is simultaneously applied to the plurality of transparent electrodes 120. That is, the optical element 40 has a simple electrical connection with a small number of wirings, and can simultaneously drive the plurality of liquid crystal cells 100 so as to distribute the shape of transmitted light in any shape. Further, since the distance between two adjacent inter-cell conductive members 170 can be increased in the optical element 40, short-circuiting between two adjacent inter-cell conductive members 170 can be suppressed.

Fifth Embodiment

An optical element 50 according to an embodiment of the present invention is described with reference to FIGS. 15A and 15B. In the following description, when a configuration of the optical element 50 is similar to the configuration of the optical element 10, the description of the configuration of the optical element 50 may be omitted.

Figure 15A:
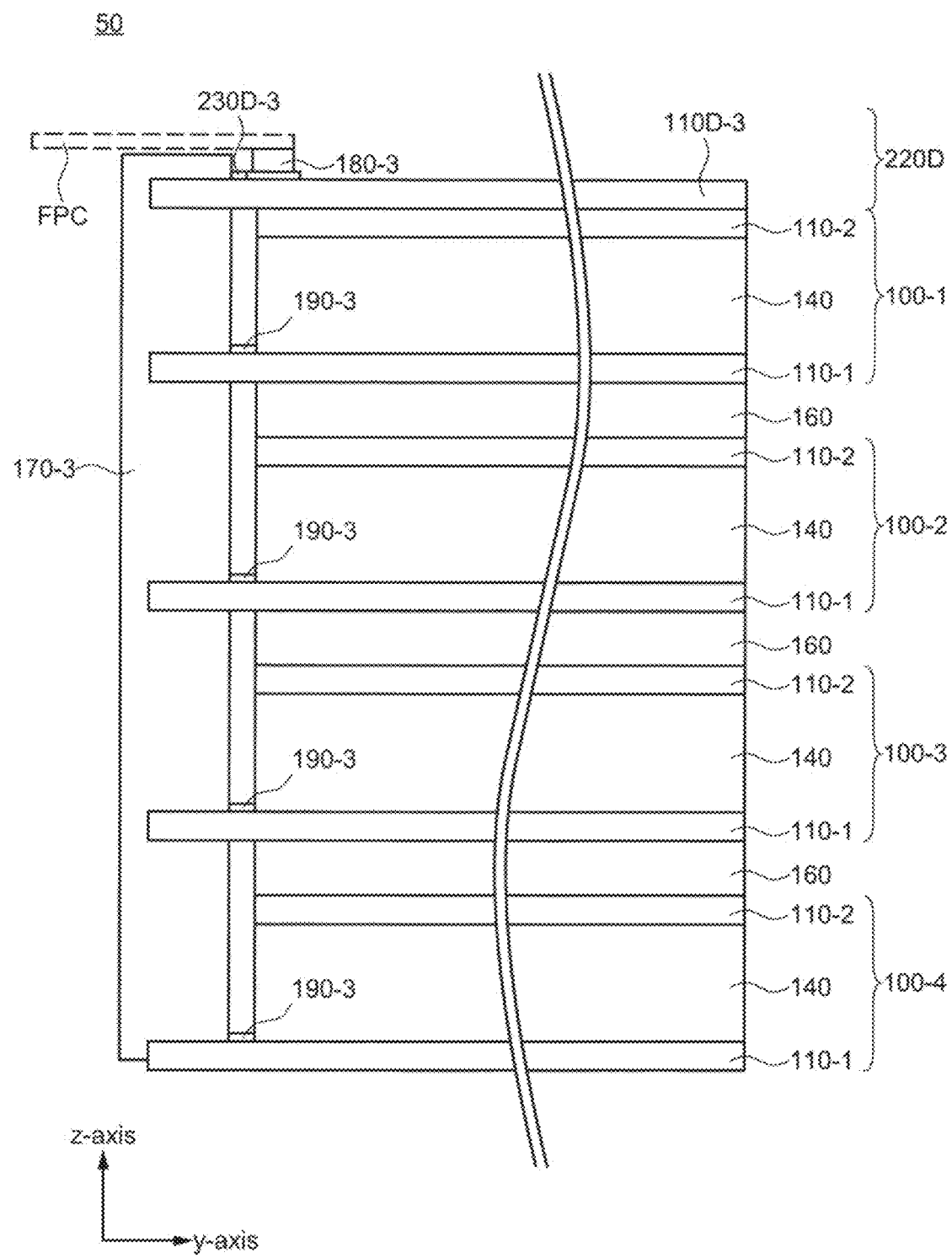
FIG. 15A is a schematic side view of an optical element according to an embodiment of the present invention (Fifth Embodiment).
Figure 15B:
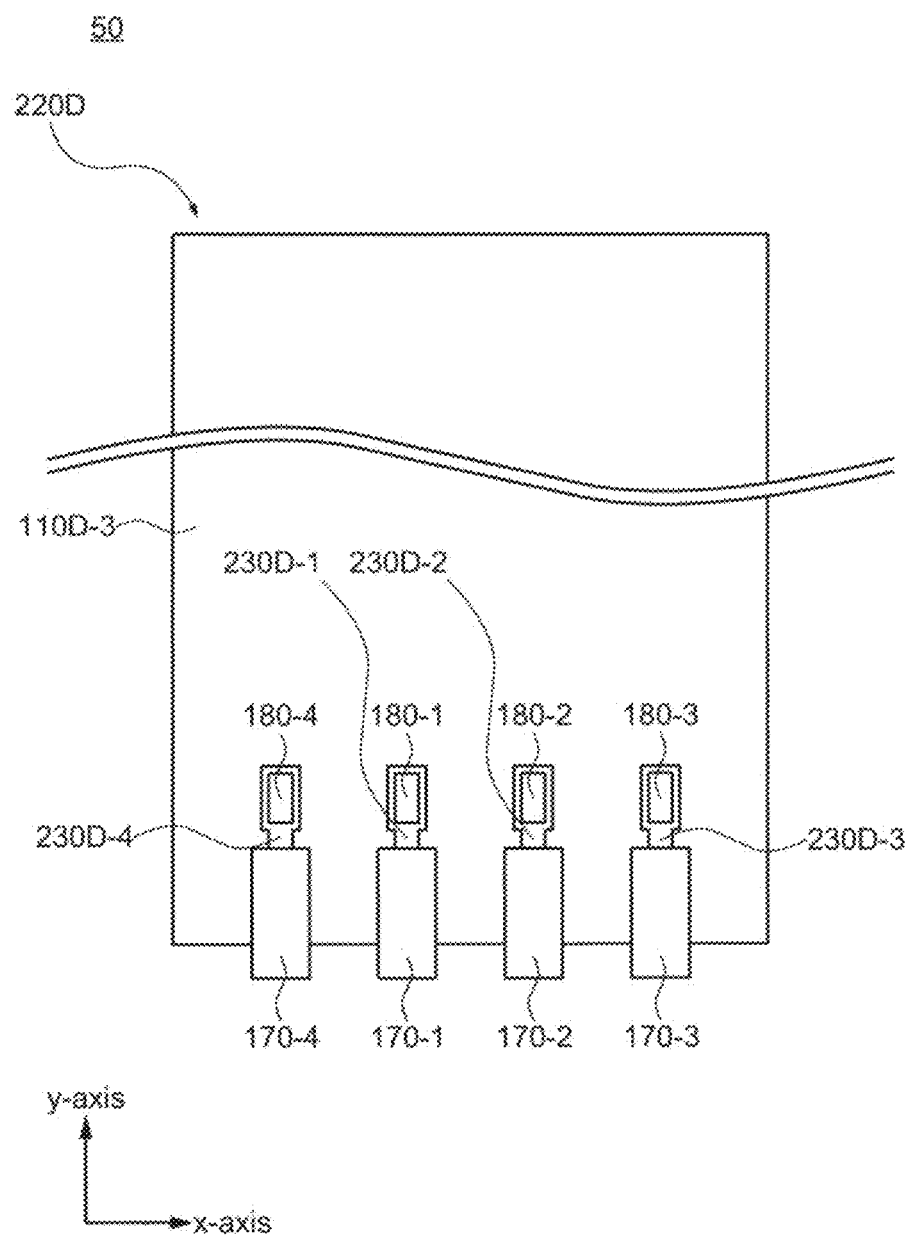
FIG. 15B is a schematic top view of an optical element according to an embodiment of the present invention (Fifth Embodiment).

FIGS. 15A and 15B are schematic side and top views, respectively, of the optical element 50 according to an embodiment of the present invention.

In the optical element 50, a terminal formation substrate 220D is provided on the first liquid crystal cell 100-1. Although not shown in the figures, the terminal formation substrate 220D may be provided on the first liquid crystal cell 100-1 via the optical elastic resin layer 160. The terminal formation substrate 220D includes a third substrate 110D-3 having a light transmission property, and a first terminal 230D-1, a second terminal 230D-2, a third terminal 230D-3, and a fourth terminal 230D-4 are provided on the third substrate 110D-3. The first terminal 230D-1, the second terminal 230D-2, the third terminal 230D-3, and the fourth terminal 230D-4 are electrically connected to the first inter-cell conductive member 170-1, the second inter-cell conductive member 170-2, the third inter-cell conductive member 170-3, and the fourth inter-cell conductive member 170-4, respectively.

Further, the first terminal 230D-1, the second terminal 230D-2, the third terminal 230D-3, and the fourth terminal 230D-4 are provided with a first pad portion 180-1, a second pad portion 180-2, a third pad portion 180-3, and a fourth pad portion 180-4, respectively. That is, in the optical element 50, an FPC can be connected to the terminal formation substrate 220D which is different from the liquid crystal cell 100. An FPC is connected to the four pad portions 180 on the terminal formation substrate 220D, and the optical element 50 can be controlled by inputting a signal via the FPC connected to the pad portions 180.

Modification 1 of Fifth Embodiment

An optical element 51 which is a modified example of the optical element 50 according to an embodiment of the present invention is described with reference to FIG. 16. In the following description, when a configuration of the optical element 51 is similar to the configuration of the optical element 50, the description of the configuration of the optical element 51 may be omitted.

Figure 16:
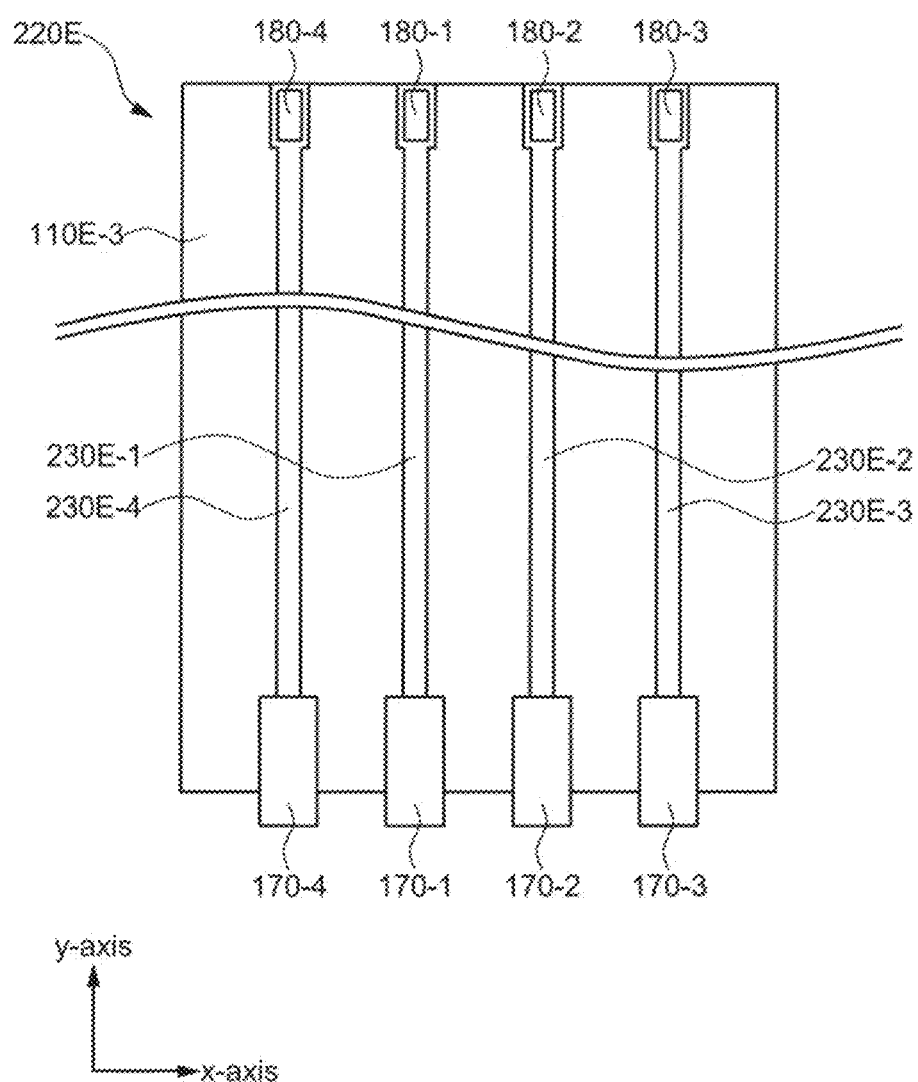
FIG. 16 is a schematic top view of an optical element according to an embodiment of the present invention (Fifth Embodiment).

FIG. 16 is a schematic top view of the optical element 51 according to an embodiment of the present invention.

In the optical element 51, a terminal formation substrate 220E is provided on the first liquid crystal cell 100-1. In the terminal formation substrate 220E, a first terminal 230E-1, a second terminal 230E-2, a third terminal 230E-3, and a fourth terminal 230E-4 are provided on a third substrate 110E-3 having a light transmission property. The first terminal 230E-1, the second terminal 230E-2, the third terminal 230E-3, and the fourth terminal 230E-4 have a transparent conductive film such as ITO or a metal film with a sufficiently small line width. Therefore, the transmittance of the terminal formation substrate 220E is sufficiently ensured. The first inter-cell conductive member 170-1, the second inter-cell conductive member 170-2, the third inter-cell conductive member 170-3, and the fourth inter-cell conductive member 170-4 are provided on one side of the optical element 51. Therefore, one end of the terminal 230 is connected to the inter-cell conductive member 170 at the upper end of one side of the optical element 51. On the other hand, the other end of the terminal 230 is located at the upper end of the other opposite side. Further, the pad portions 180 are provided at the other end of the terminal 230. That is, in the optical element 51, an FPC can be connected to the four pad portions 180 on the side opposite the position of the inter-cell conductive member 170.

Modification 2 of Fifth Embodiment

An optical element 52 which is another modified example of the optical element 50 according to an embodiment of the present invention is described with reference to FIGS. 17 and 18. In the following description, when a configuration of the optical element 52 is similar to the configuration of the optical element 50, the description of the configuration of the optical element 51 may be omitted.

Figure 17:
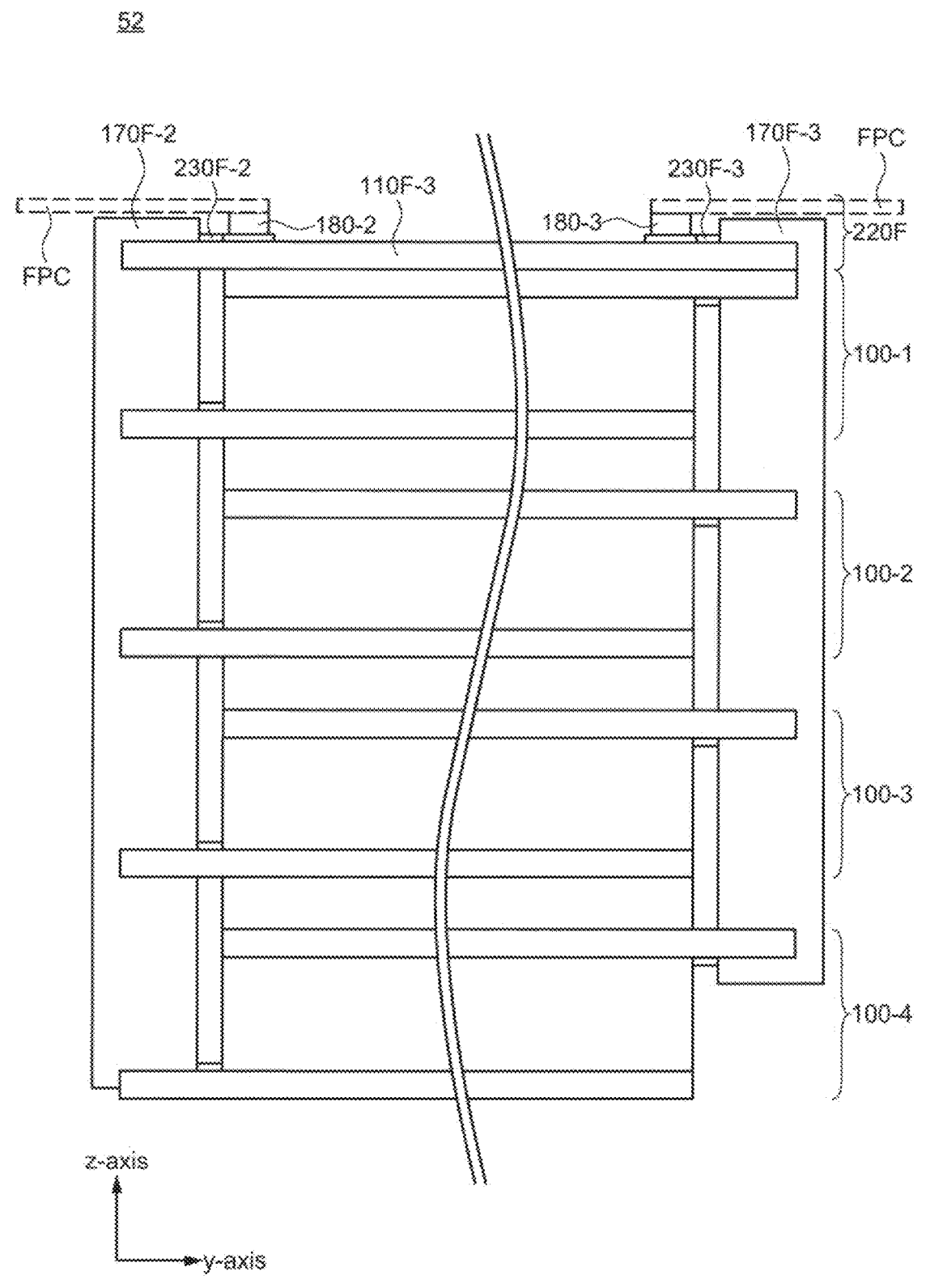
Figure 18:
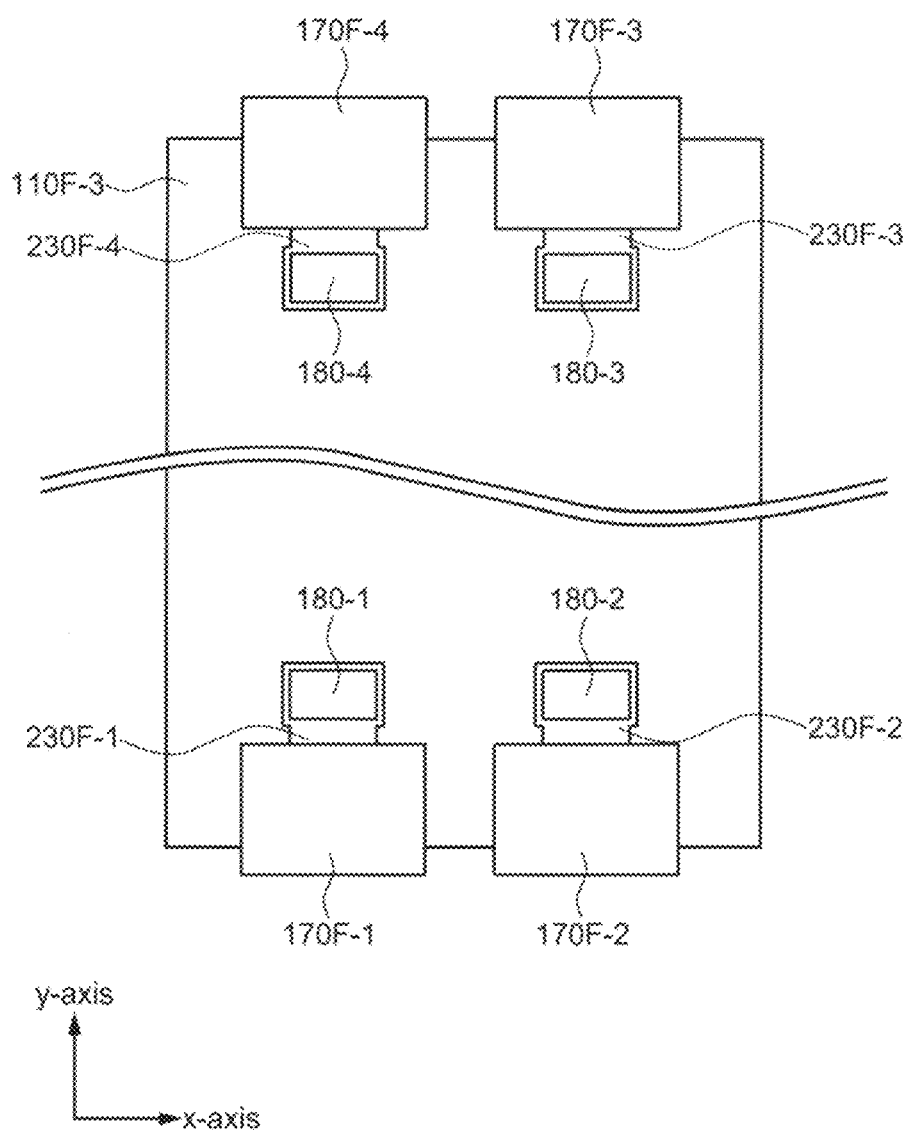
FIG. 18 is a schematic top view of an optical element according to one embodiment of the present invention (Fifth Embodiment).

FIGS. 17 and 18 are schematic side and top views, respectively, of the optical element 52 according to an embodiment of the present invention.

In the optical element 52, a terminal formation substrate 220F is provided on the first liquid crystal cell 100-1. The configuration of the liquid crystal cell 100 of the optical element 52 is similar to the configuration of the liquid crystal cell 100 of the optical element 40. Further, although the configuration of the inter-cell conductive member 170F is similar to the configuration of the inter-cell conductive member 170C, the inter-cell conductive member 170F differs from the inter-cell conductive member 170C in that the inter-cell conductive member 170F is connected to a terminal formation substrate 220F provided on the first liquid crystal cell 100-1.

The terminal formation substrate 220F includes a third substrate 110F-3 having a light transmission property, and a first terminal 230F-1, a second terminal 230F-2, a third terminal 230F-3, and a fourth terminal 230F-4 are provided on the third substrate 110F-3. Each of the first terminal 230F-1 and the second terminal 230F-2 is provided at one end portion of the third substrate 110F-3, and each of the third terminal 230F-3 and the fourth terminal 230F-4 is provided at the other end portion located on the opposite end portion of the third substrate 110F-3. The first terminal 230F-1, the second terminal 230F-2, the third terminal 230F-3, and the fourth terminal 230F-4 are electrically connected to the first inter-cell conductive member 170F-1, the second inter-cell conductive member 170F-2, the third inter-cell conductive member 170F-3, and the fourth inter-cell conductive member 170F-4, respectively.

Further, the first terminal 230F-1, the second terminal 230F-2, the third terminal 230F-3, and the fourth terminal 230F-4 are provided with the first pad portion 180-1, the second pad portion 180-2, the third pad portion 180-3, and the fourth pad portion 180-4, respectively. That is, in the optical element 52, an FPC can be connected to the terminal formation substrate 220F which is different from the liquid crystal cell 100. An FPC is connected to the four pad portions 180 on the terminal formation substrate 220F, and the optical element 52 can be controlled by inputting a signal via the FPC connected to the pad portions 180.

As described above, the optical element 50 including the modified examples includes the terminal forming substrate 220D, and the electrical connection between the optical element 50 and the FPC can be made using the terminal forming substrate 220D. Therefore, since wirings or electrodes in the mounting process can be concentrated in the terminal formation substrate 220D, the mounting process can be simplified.

Sixth Embodiment

An optical element 60 according to an embodiment of the present invention is described with reference to FIGS. 19A to 19C. In the following description, when a configuration of the optical element 60 is similar to the configuration of the optical element 20, the description of the configuration of the optical element 60 may be omitted.

[1. Configuration of Optical Element 60]

Figure 19A:
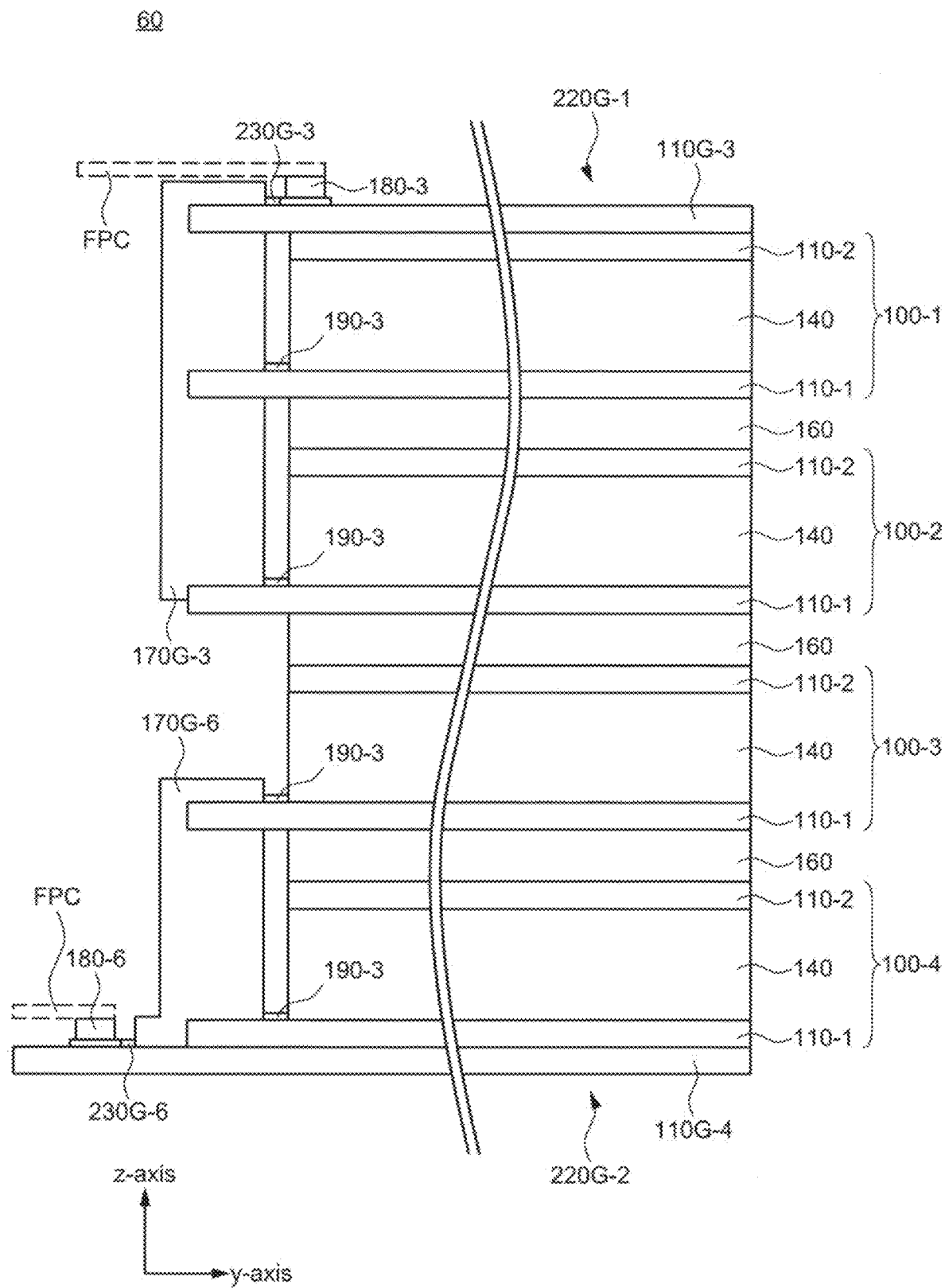
FIG. 19A is a schematic side view of an optical element according to an embodiment of the present invention (Sixth Embodiment).
Figure 19B:
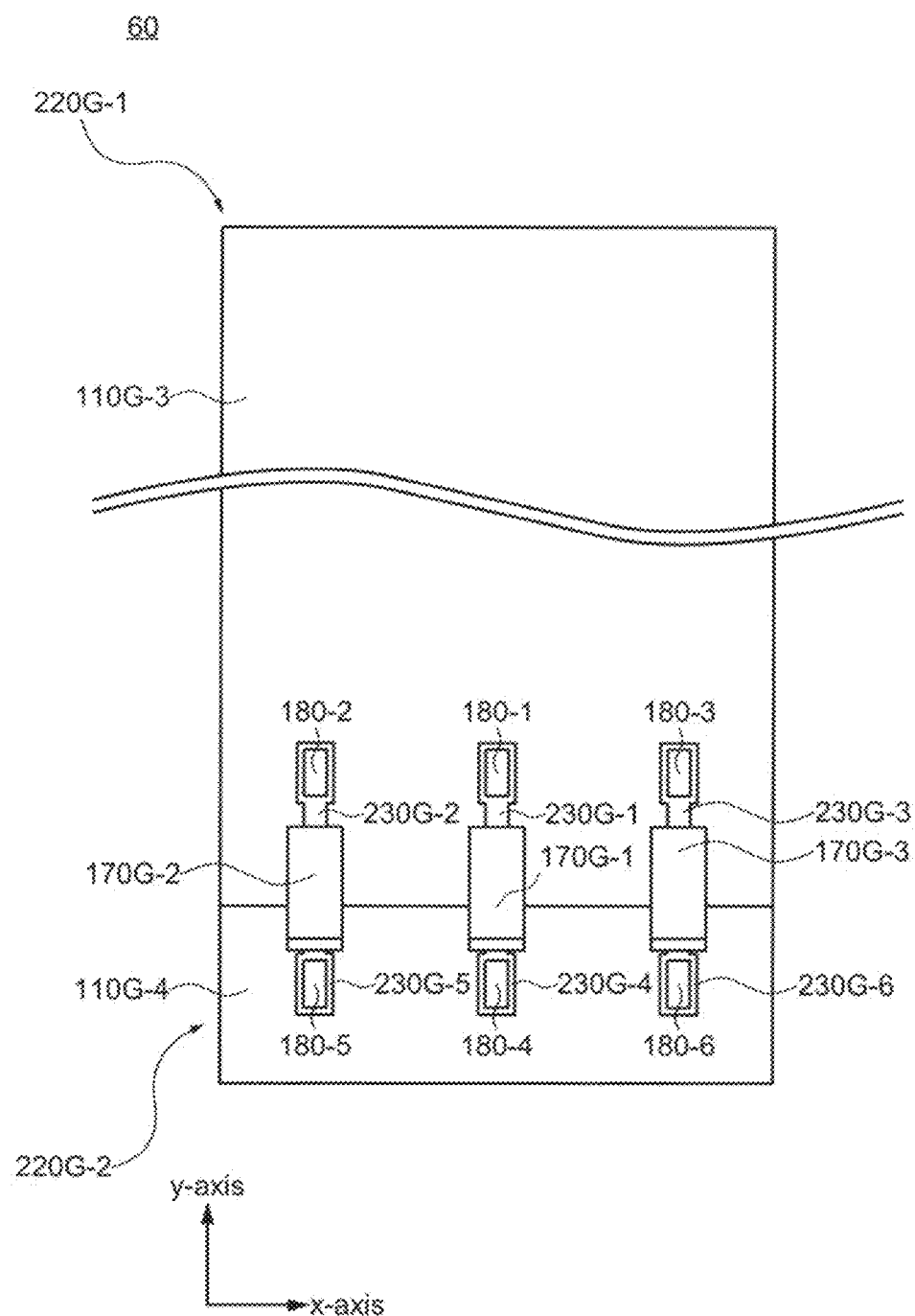
FIG. 19B is a schematic top view of an optical element according to an embodiment of the present invention (Sixth Embodiment).
Figure 19C:
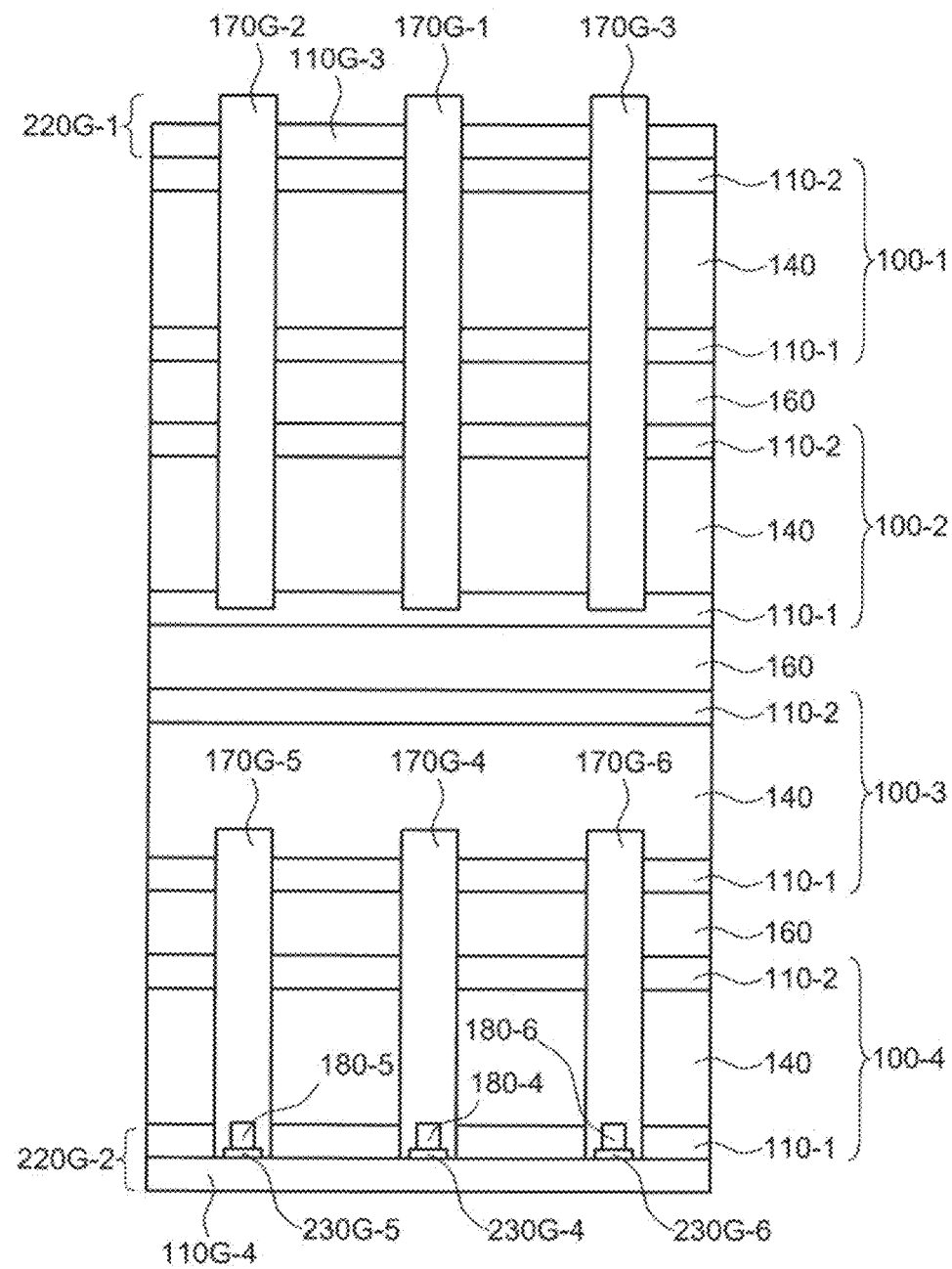
FIG. 19C is a schematic front view of an optical element according to an embodiment of the present invention (Sixth Embodiment).

FIGS. 19A, 19B, and 19C are a schematic side view, a top view, and a front view, respectively, of the optical element 60 according to an embodiment of the present invention. Although the configuration of the liquid crystal cell 100 of the optical element 60 is similar to the configuration of the liquid crystal cell 100 of the optical element 20, in the optical element 60, the first liquid crystal cell 100-1 and the third liquid crystal cell 100-3 have the electrode patterns E and F, and the second liquid crystal cell 100-2 and the fourth liquid crystal cell 100-4 have the electrode patterns G and H.

In the optical element 60, a first terminal formation substrate 220G-1 is provided over the first liquid crystal cell 100-1, and a second terminal formation substrate 220G-2 is provided below the fourth liquid crystal cell 100-4. The first terminal formation substrate 220G-1 includes a third substrate 110G-3 having a light transmission property, and a first terminal 230G-1, a second terminal 230G-2, and a third terminal 230G-3 are provided on the third substrate 110G-3. The second terminal formation substrate 220G-2 includes a fourth substrate 110G-4 having a light transmission property, and a fourth terminal 230G-4, a fifth terminal 230G-5, and a sixth terminal 230G-6 are provided on the fourth substrate 110G-4. The first terminal 230G-1, the second terminal 230G-2, the third terminal 230G-3, the fourth terminal 230G-4, the fifth terminal 230G-5, and the sixth terminal 230G-6 are electrically connected to a first inter-cell conductive member 170G-1, a second inter-cell conductive member 170G-2, a third inter-cell conductive member 170G-3, a fourth inter-cell conductive member 170G-4, a fifth inter-cell conductive member 170G-5, and a sixth inter-cell conductive member 170G-6, respectively.

The first inter-cell conductive member 170G-1 is electrically connected to the first pad 190-1 of each of the first liquid crystal cell 100-1 and the second liquid crystal cell 100-2. The second inter-cell conductive member 170G-2 is electrically connected to the second pad 190-2 of each of the first liquid crystal cell 100-1 and the second liquid crystal cell 100-2. The third inter-cell conductive member 170G-3 is electrically connected to the third pad 190-3 of each of the first liquid crystal cell 100-1 and the second liquid crystal cell 100-2. On the other hand, the fourth inter-cell conductive member 170G-4 is electrically connected to the first pad 190-1 of each of the third liquid crystal cell 100-3 and the fourth liquid crystal cell 100-4. The fifth inter-cell conductive member 170G-5 is electrically connected to the second pad 190-2 of each of the third liquid crystal cell 100-3 and the fourth liquid crystal cell 100-4. The sixth inter-cell conductive member 170G-6 is electrically connected to the third pad 190-3 of each of the third liquid crystal cell 100-3 and the fourth liquid crystal cell 100-4.

In the optical element 60 according to this embodiment, each of the divided liquid crystal cells 100 can be driven independently by a signal input through six inter-cell conductive members 170. Specifically, potentials can be separately and independently applied to the transparent electrodes 120 of the first liquid crystal cell 100-1 and the second liquid crystal cell 100-2 located over the optical element 10 and to the transparent electrodes 120 of the third liquid crystal cell 100-3 and the fourth liquid crystal cell 100-4 located below the optical element 10.

In addition, the optical element 60 can also control the shape of the light distribution of the light emitted from the light source 300, similar to the optical element 20 described above.

As described above, in the optical element 60, the first liquid crystal cell 100-1 and the third liquid crystal cell 100-3 each have the electrode pattern E and the electrode pattern F, and the second liquid crystal cell 100-2 and the fourth liquid crystal cell 100-4 each have the electrode pattern G and the electrode pattern H. Further, the first liquid crystal cell 100-1 and the second liquid crystal cell 100-2, and the third liquid crystal cell 100-3 and the fourth liquid crystal cell 100-4 can be separately and independently driven using the first terminal formation substrate 220G-1 and the second terminal formation substrate 220G-2. Therefore, the optical element 60 can simultaneously drive a plurality of liquid crystal cells 100 to distribute the shape of transmitted light into any shape while having electrical connections that can simplify the mounting process.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. An optical element comprising a plurality of stacked liquid crystal cells, the plurality of stacked liquid crystal cells each comprising:
   a first substrate on which a first transparent electrode, a second transparent electrode, a first pad, a second pad, and a third pad are arranged;
   a second substrate on which a third transparent electrode and a fourth transparent electrode are arranged; and
   a liquid crystal layer between the first substrate and the second substrate,
   wherein the first pad, the second pad, and the third pad of each of the plurality of stacked liquid crystal cells are electrically connected to a first inter-cell conductive member, a second inter-cell conductive member, and a third inter-cell conductive member, respectively, extending in a stacking direction.

2. The optical element according to claim 1,
   wherein a fourth pad is further provided on the first substrate of each of the plurality of stacked liquid crystal cells, and
   the fourth pad of each of the plurality of stacked liquid crystal cells is electrically connected to a fourth inter-cell conductive member extending in the stacking direction.

3. The optical element according to claim 2,
   wherein the plurality of stacked liquid crystal cells comprises a first liquid crystal cell and a second liquid crystal cell overlapping the first liquid crystal cell,
   in each of the first liquid crystal cell and the second liquid crystal cell,
   the first transparent electrode and the second transparent electrode extend in a first direction,
   the third transparent electrode and the fourth transparent electrode extend in a second direction orthogonal to the first direction,
   the first pad is electrically connected to the first transparent electrode,
   the second pad is electrically connected to the second transparent electrode,
   the third pad is electrically connected to the third transparent electrode through a first conductive paste, and
   the fourth pad is electrically connected to the fourth transparent electrode through a second conductive paste.

4. The optical element according to claim 3,
   wherein a first terminal, a second terminal, a third terminal, and a fourth terminal electrically connected to the first pad, the second pad, the third pad, and the fourth pad, respectively, are further provided on the first substrate of the first liquid crystal cell, and
   an insulating layer is provided between a first wiring connecting the first pad to the first terminal and a second wiring connecting the second pad to the second terminal.

5. The optical element according to claim 3,
wherein the plurality of stacked liquid crystal cells further comprises a third liquid crystal cell overlapping the second liquid crystal cell and a fourth liquid crystal cell overlapping the third liquid crystal cell,
in each of the third liquid crystal cell and the fourth liquid crystal cell,
the first transparent electrode and the second transparent electrode extend in the second direction,
the third transparent electrode and the fourth transparent electrode extend in the first direction,
the first pad is electrically connected to the third transparent electrode through a third conductive paste,
the second pad is electrically connected to the fourth transparent electrode through a fourth conductive paste,
the third pad is electrically connected to the first transparent electrode, and
the fourth pad is electrically connected to the second transparent electrode.

6. The optical element according to claim 4,
wherein a first terminal, a second terminal, a third terminal, and a fourth terminal electrically connected to the first pad, the second pad, the third pad, and the fourth pad, respectively, are further provided on the first substrate of the first liquid crystal cell, and
an insulating layer is provided between a first wiring connecting the first pad to the first terminal and a second wiring connecting the second pad to the second terminal.

7. The optical element according to claim 6, further comprising a flexible printed circuit electrically connected to the first terminal, the second terminal, the third terminal, and the fourth terminal.

8. The optical element according to claim 2, wherein a first surface on which the first inter-cell conductive member and the second inter-cell conductive member are provided is different from a second surface on which the third inter-cell conductive member and the fourth inter-cell conductive member are provided.

9. The optical element according to claim 2, further comprising a terminal formation substrate disposed on one of an upper side and a lower side of the plurality of stacked liquid crystal cells,
wherein the terminal formation substrate comprises:
a first terminal electrically connected to the first inter-cell conductive member;
a second terminal electrically connected to the second inter-cell conductive member;
a third terminal electrically connected to the third inter-cell conductive member; and
a fourth terminal electrically connected to the fourth inter-cell conductive member.

10. The optical element according to claim 9, further comprising a flexible printed circuit electrically connected to the first terminal, the second terminal, the third terminal, and the fourth terminal.

11. The optical element according to claim 1,
wherein the plurality of stacked liquid crystal cells comprises a first liquid crystal cell and a second liquid crystal cell adjacent to the first liquid crystal cell,
in each of the first liquid crystal cell and the second liquid crystal cell,
the first transparent electrode and the second transparent electrode extend in a first direction,
the third transparent electrode and the fourth transparent electrode extend in a second direction orthogonal to the first direction,
the first pad is electrically connected to the first transparent electrode,
the second pad is electrically connected to the third transparent electrode though a first conductive paste, and
the third pad is electrically connected to the second transparent electrode and is electrically connected to the fourth transparent electrode through a second conductive paste.

12. The optical element according to claim 11, further comprising a terminal formation substrate disposed on one of an upper side and a lower side of the plurality of stacked liquid crystal cells,
wherein the terminal formation substrate comprises:
a first terminal electrically connected to the first inter-cell conductive member;
a second terminal electrically connected to the second inter-cell conductive member; and
a third terminal electrically connected to the third inter-cell conductive member.

13. The optical element according to claim 12, further comprising a flexible printed circuit electrically connected to the first terminal, the second terminal, and the third terminal.

14. The optical element according to claim 11,
wherein the plurality of stacked liquid crystal cells further comprises a third liquid crystal cell and a fourth liquid crystal cell adjacent to the first liquid crystal cell,
in each of the third liquid crystal cell and the fourth liquid crystal cell,
the first transparent electrode and the second transparent electrode extend in the second direction,
the third transparent electrode and the fourth transparent electrode extend in the first direction,
the first pad is electrically connected to the third transparent electrode through a third conductive paste,
the second pad is electrically connected to the first transparent electrode, and
the third pad is electrically connected to the second transparent electrode and is electrically connected to the fourth transparent electrode.

15. The optical element according to claim 1,
wherein the plurality of stacked liquid crystal cells comprises a first liquid crystal cell, a second liquid crystal cell adjacent to the first liquid crystal cell, a third liquid crystal cell adjacent to the second liquid crystal cell, and a fourth liquid crystal cell adjacent to the third liquid crystal cell,
in each of the first liquid crystal cell and the third liquid crystal cell,
the first transparent electrode and the second transparent electrode extend in a first direction,
the third transparent electrode and the fourth transparent electrode extend in a second direction orthogonal to the first direction,
the first pad is electrically connected to the first transparent electrode,
the second pad is electrically connected to the third transparent electrode through a first conductive paste, and
the third pad is electrically connected to the second transparent electrode and is electrically connected to the fourth transparent electrode through a second conductive paste, in each of the second liquid crystal cell and the fourth liquid crystal cell, the first transparent electrode and the second transparent electrode extend in the second direction, the third transparent electrode and the fourth transparent electrode extend in the first direction, the first pad is electrically connected to the third transparent electrode through a third conductive paste, the second pad is electrically connected to the first transparent electrode, and the third pad is electrically connected to the second transparent electrode and is electrically connected to the fourth transparent electrode through a fourth conductive paste.

16. The optical element according to claim 15, further comprising a terminal formation substrate disposed on one of an upper side and a lower side of the plurality of stacked liquid crystal cells, wherein the terminal formation substrate comprises:
a first terminal electrically connected to the first inter-cell conductive member;
a second terminal electrically connected to the second inter-cell conductive member; and
a third terminal electrically connected to the third inter-cell conductive member.

17. The optical element according to claim 16, further comprising a flexible printed circuit electrically connected to the first terminal, the second terminal, and the third terminal.

\* \* \* \* \*